United States Patent [19]

Papp

[11] 4,428,193

[45] Jan. 31, 1984

[54] INERT GAS FUEL, FUEL PREPARATION APPARATUS AND SYSTEM FOR EXTRACTING USEFUL WORK FROM THE FUEL

[75] Inventor: Joseph Papp, Santa Ana, Calif.

[73] Assignee: Papp International Incorporated, Lincoln, Nebr.

[21] Appl. No.: 184,405

[22] Filed: Sep. 4, 1980

[51] Int. Cl.$^3$ ............................................. F01K 25/08
[52] U.S. Cl. ........................................ 60/509; 60/516; 60/531; 60/721; 123/1 A; 123/536; 376/146; 376/317; 376/318
[58] Field of Search ............. 376/318, 317, 346; 123/1 A, 198 A, 536; 60/509, 516, 531, 513, 721

[56] References Cited

U.S. PATENT DOCUMENTS

| | | | |
|---|---|---|---|
| 2,169,844 | 8/1939 | Marshall, Jr. | 123/1 A |
| 2,590,168 | 3/1952 | Felici | 310/10 |
| 3,386,245 | 6/1968 | Gamage | 376/318 |
| 3,549,490 | 7/1970 | Moore | 376/317 |
| 3,670,494 | 6/1972 | Papp | 60/23 |
| 3,680,431 | 8/1972 | Papp | 89/7 |
| 3,977,191 | 8/1976 | Britt | 60/509 |
| 4,023,065 | 5/1977 | Koloc | 376/146 |
| 4,081,712 | 3/1978 | Bode et al. | 313/226 |

FOREIGN PATENT DOCUMENTS 2056199  5/1972  Fed. Rep. of Germany ...... 376/318

OTHER PUBLICATIONS

Essentials of Astronomy, (7/68) Motz et al., p. 394.
Condensed Chemical Dictionary, 9th Ed, Hawley Ed, VanNostrand Reinhold Co., New York pp. 431 and 621.
New Scientist (5/24/79) pp. 626–630.

Primary Examiner—Sal Cangialosi
Attorney, Agent, or Firm—Senniger, Powers, Leavitt and Roedel

[57] ABSTRACT

An inert gas fuel consisting essentially of a precise, homogeneous mixture of helium, neon, argon, krypton and xenon. Apparatus for preparing the fuel includes a mixing chamber, tubing to allow movement of each inert gas into and through the various stages of the apparatus, a plurality of electric coils for producing magnetic fields, an ion gauge, ionizers, cathode ray tubes, filters, a polarizer and a high frequency generator. An engine for extracting useful work from the fuel has at least two closed cylinders for fuel, each cylinder being defined by a head and a piston. A plurality of electrodes extend into each chamber, some containing low level radioactive material. The head has a generally concave depression facing a generally semi-toroidal depression in the surface of the piston. The piston is axially movable with respect to the head from a first position to a second position and back, which linear motion is converted to rotary motion by a crankshaft. The engine's electrical system includes coils and condensers which circle each cylinder, an electric generator, and circuitry for controlling the flow of current within the system.

71 Claims, 36 Drawing Figures

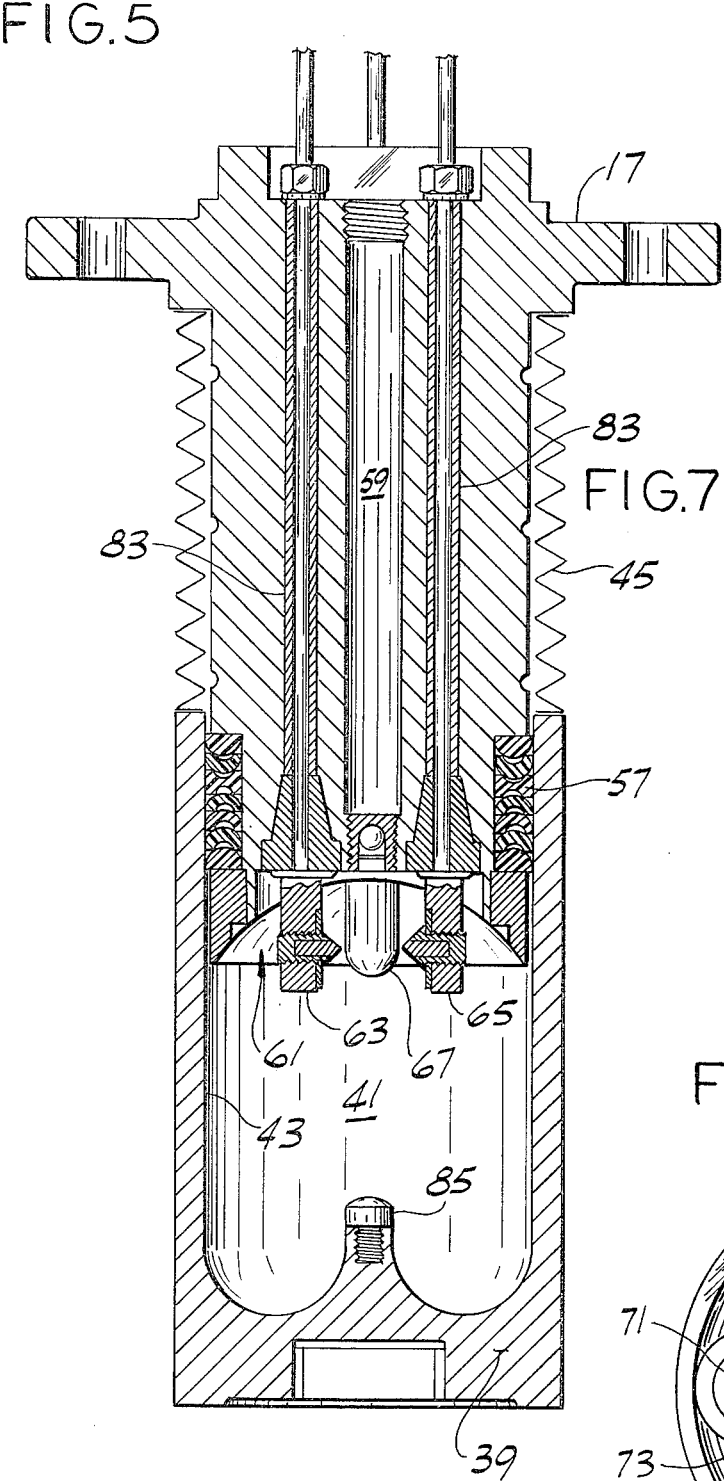
FIG. 5
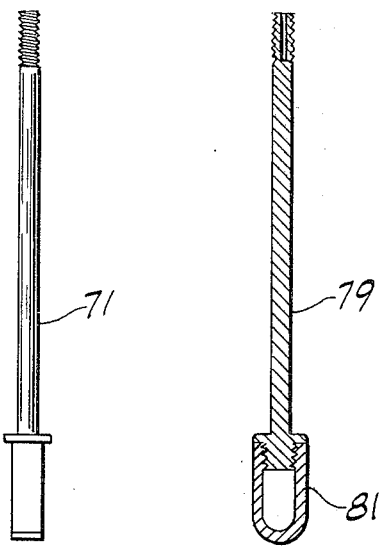
FIG. 10
FIG. 7
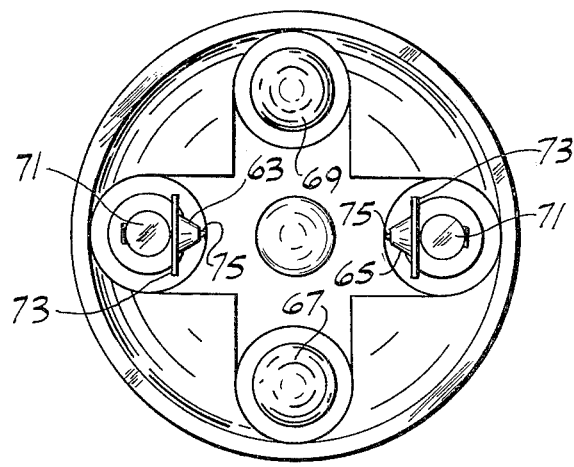
FIG. 6

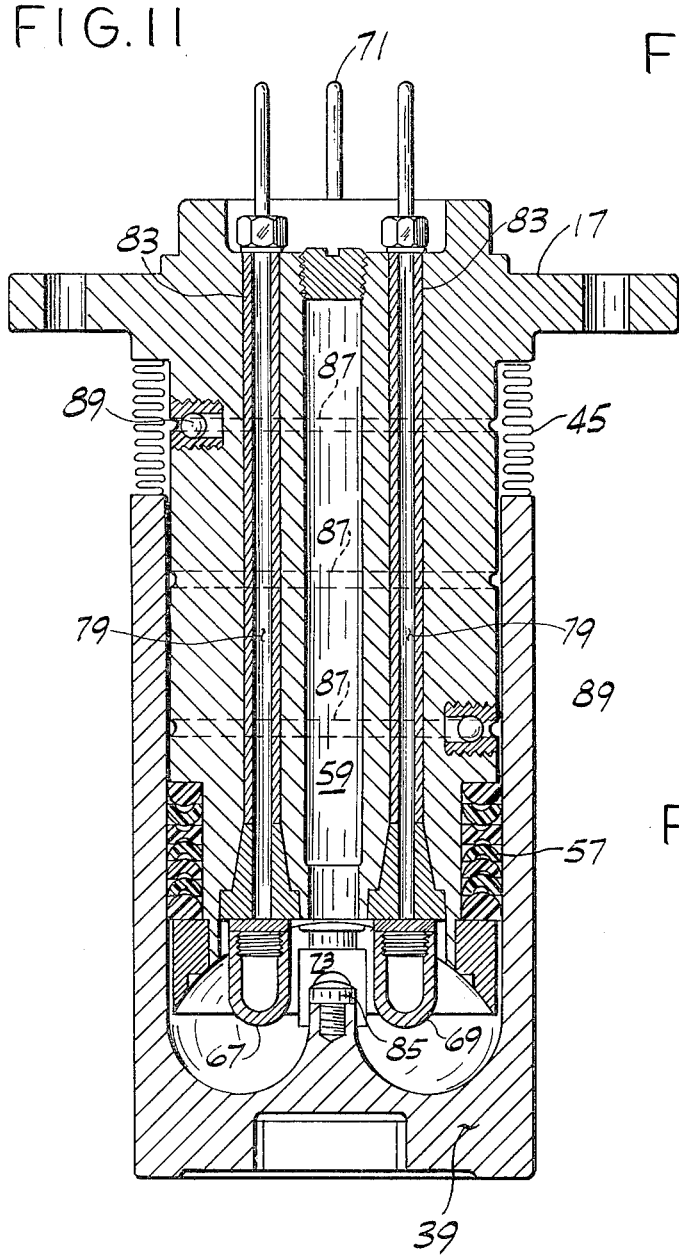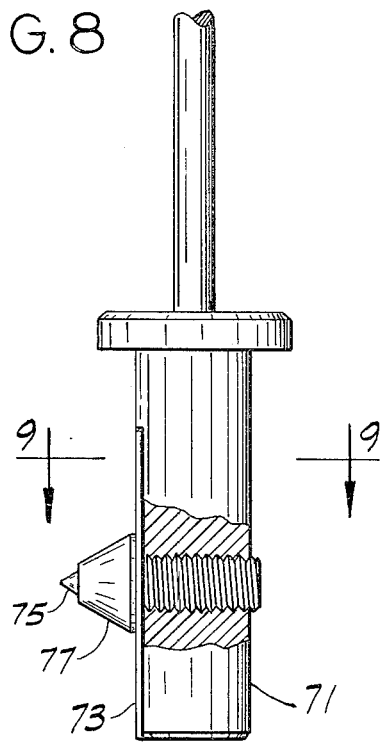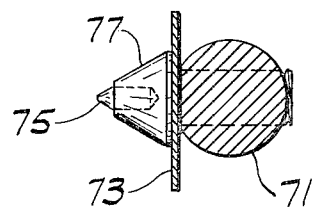

FIG.12
FIG.12A
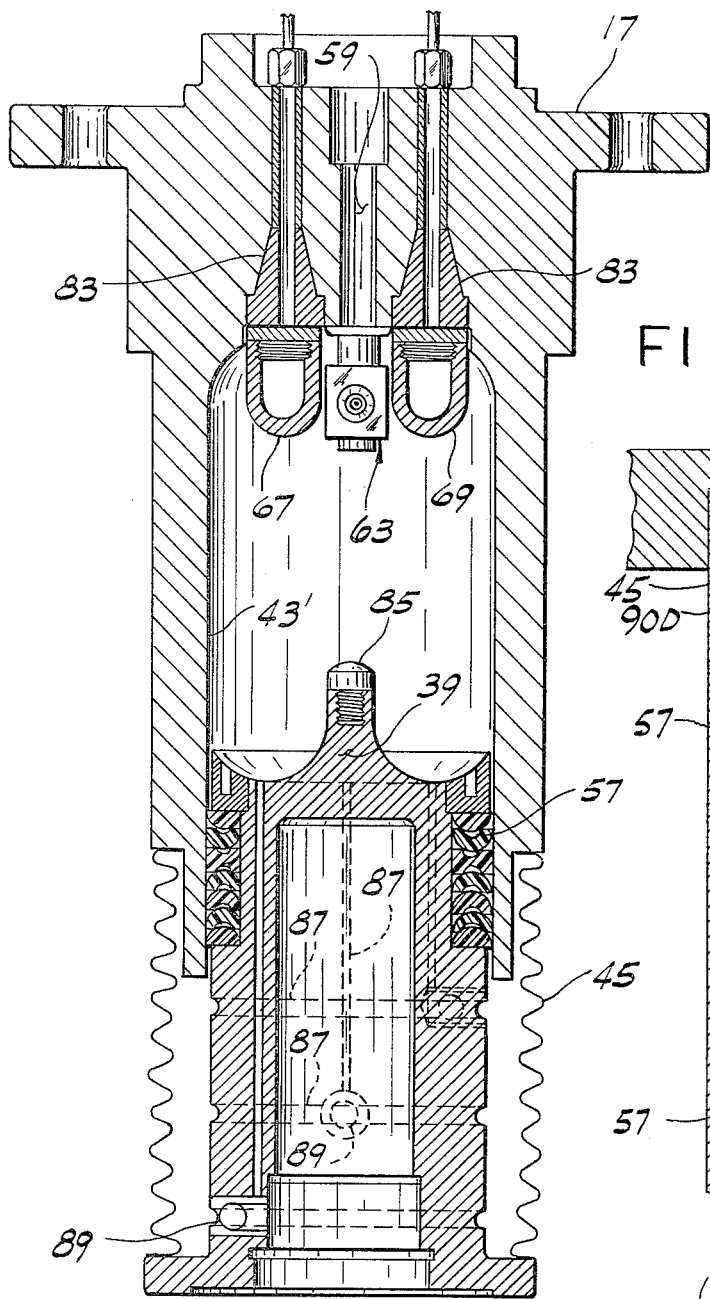
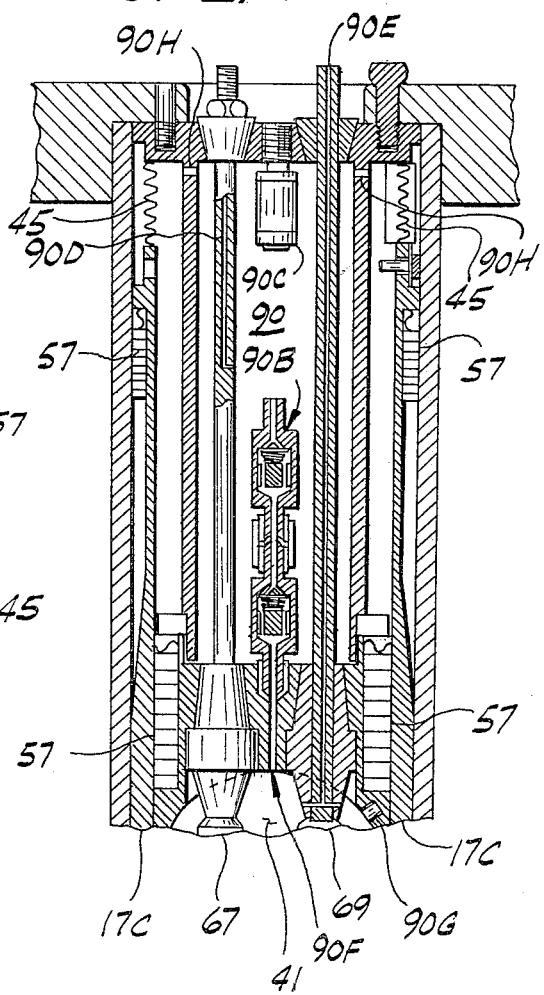

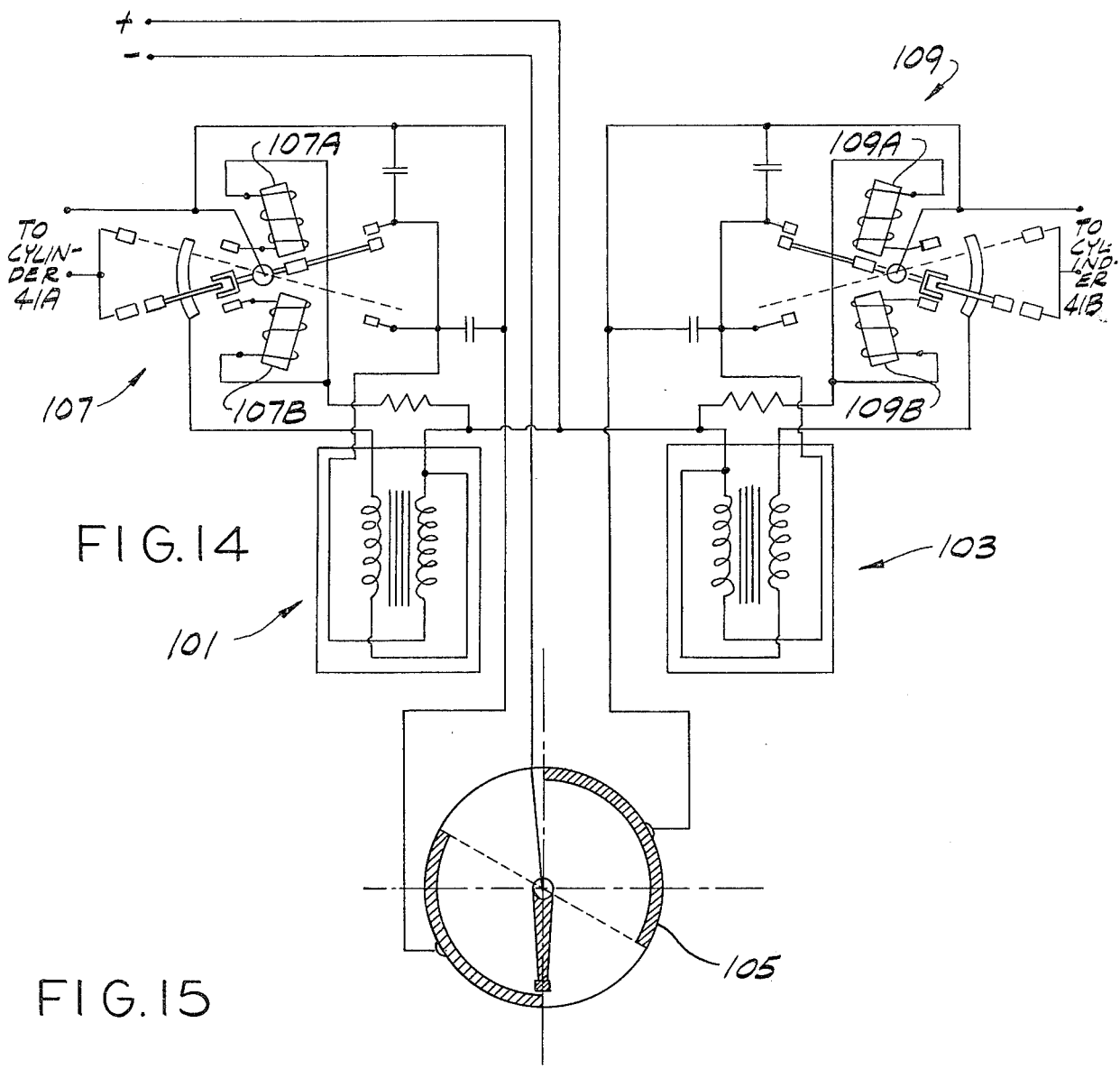
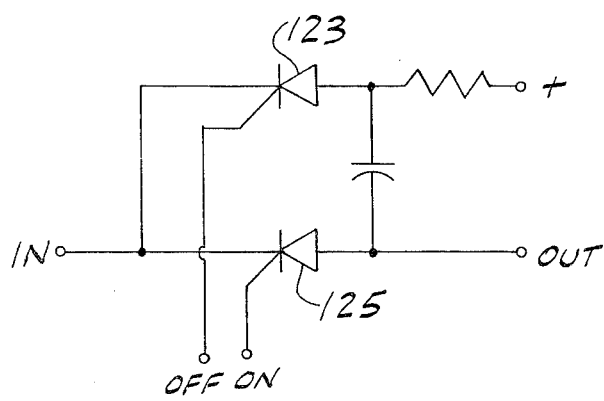
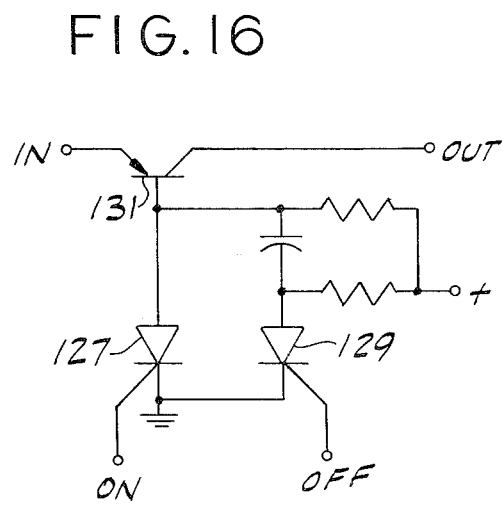
FIG. 14
FIG. 15
FIG. 16

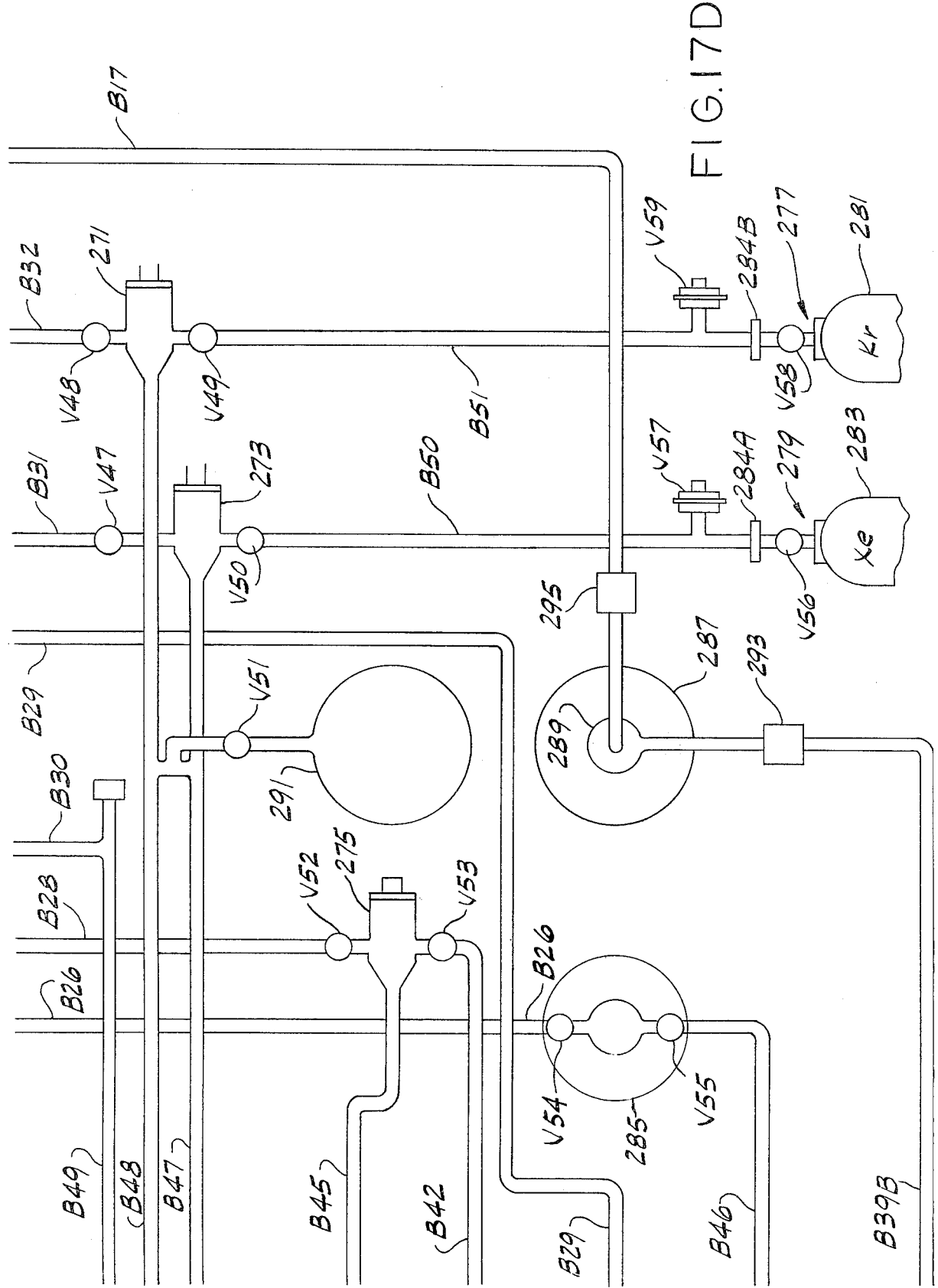

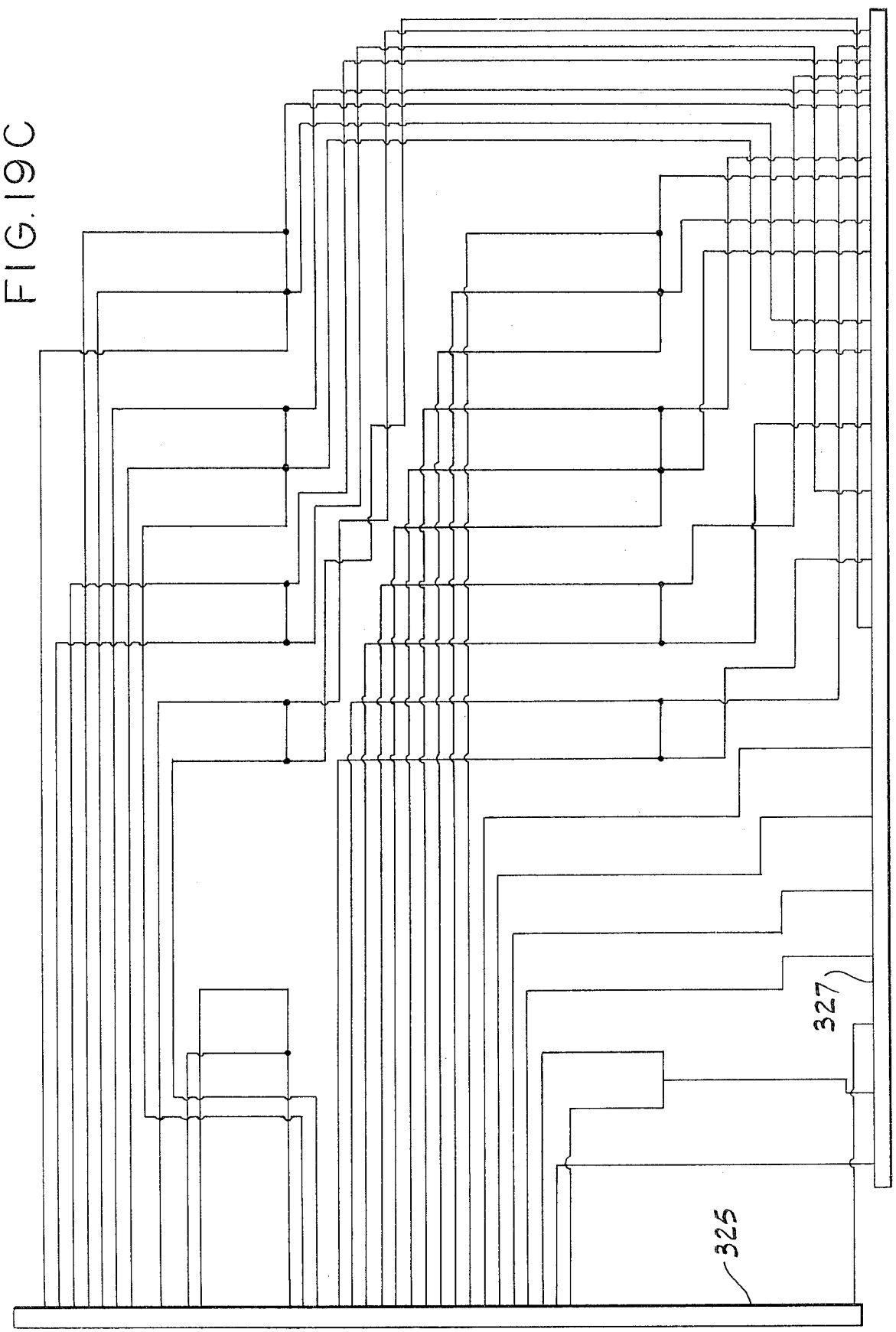

INERT GAS FUEL, FUEL PREPARATION APPARATUS AND SYSTEM FOR EXTRACTING USEFUL WORK FROM THE FUEL

BACKGROUND OF THE INVENTION

This invention relates to closed reciprocating engines, i.e., ones which do not require an air supply and do not emit exhaust gases, and more particularly to such engines which use inert gases as fuel. It also concerns such inert gas fuels and apparatus for preparing same.

Currently available internal combustion engines suffer from several disadvantages. They are inefficient in their utilization of the energy present in their fuels. The fuel itself is generally a petroleum derivative with an ever-increasing price and sometimes limited availability. And the burning of such fuel normally results in pollutants which are emitted into the atmosphere. These engines require oxygen and, therefore, are particularly unsuitable in environments, such as underwater or outer space, in which gaseous oxygen is relatively unavailable. Present internal combustion engines are, furthermore, relatively complex with a great number of moving parts. Larger units, such as fossil-fuel electric power plants, escape some of the disadvantages of the present internal combustion engine, but not, inter alia, those of pollution, price of fuel and availability of fuel.

Several alternative energy sources have been proposed, such as the sun (through direct solar power devices), nuclear fission and nuclear fusion. But because of lack of public acceptance, cost, other pollutants, technical problems, and/or lack of development, these sources have not wholly solved the problem.

Moreover, the preparation of fuel for nuclear fission and nuclear fusion reactors has heretofore been a complicated process requiring expensive apparatus.

SUMMARY OF THE INVENTION

Among the several objects of the present invention may be noted the provision of an engine which is efficient; the provision of an engine which does not require frequent refueling; the provision of an engine which develops no pollutants in operation; the provision of an engine which is particularly suited for use in environments devoid of free oxygen; the provision of an engine which requires no oxygen in operation; the provision of an engine having a relatively small number of moving parts; the provision of an engine of a relatively simple construction; the provision of an engine which can be used in light and heavy-duty applications; the provision of an engine which is relatively inexpensive to make and operate; the provision of a fuel which uses widely available components; the provision of a fuel which is relatively inexpensive; the provision of a fuel which is not a petroleum derivative; the provision of relatively simple and inexpensive apparatus for preparing inert gases for use as a fuel; the provision of such apparatus which mixes inert gases in precise, predetermined ratios; and the provision of such apparatus which eliminates contaminants from the inert gas mixture. Other objects and features will be in part apparent and in part pointed out hereinafter.

Briefly, in one aspect the engine of the present invention includes a head having a generally concave depression therein, the head defining one end of a chamber, a piston having a generally semitoroidal depression in its upper surface, the piston defining the other end of the chamber, and a plurality of electrodes extending into the chamber for exciting and igniting the working fluid. The piston is axially movable with respect to the head from a first position to a second position and back, the volume of the chamber being determined by the position of the piston relative to the head.

In another aspect, the engine of the present invention includes a head which defines one end of the chamber, a piston which defines the other end of the chamber, a plurality of magnetic coils wound around the chamber for generating magnetic fields inside the chamber, and at least four electrodes extending into the chamber for exciting and igniting the working fluid. The piston is axially movable with respect to the head from a first position to a second position and back, the volume of the chamber being determined by the position of the piston relative to the head. The magnetic coils are generally coaxial with the chamber. The electrodes are generally equidistantly spaced from the axis of the chamber and are each disposed generally 90° from the adjacent electrodes. Lines between opposed pairs of electrodes intersect generally on the axis of the chamber to define a focal point.

In a further aspect, the engine of the present invention includes a head which defines one end of a chamber, a piston which defines the other end of the chamber, at least two electric coils wound around the chamber for generating magnetic fields inside the chamber, and a plurality of electrodes extending into the chamber for exciting and igniting the working fluid. The piston is axially movable with respect to the head from a first position to a second position and back, the volume of the chamber being determined by the position of the piston relative to the head. The electric coils are generally coaxial with the chamber. And the working fluid includes a mixture of inert gases.

The apparatus of the present invention for preparing a mixture of inert gases for use as a fuel includes a chamber, electric coils for generating predetermined magnetic fields inside the chamber, tubing adapted to be connected to sources of preselected inert gases for flow of the gases from the sources to the chamber, and ionizers for ionizing the gases.

The fuel of the present invention includes a mixture of inert gases including approximately 36% helium, approximately 26% neon, approximately 17% argon, approximately 13% krypton, and approximately 8% xenon by volume.

BRIEF DESCRIPTION OF THE DRAWINGS

FIG. 5 is a cross-sectional view of a cylinder of an engine of this invention;

FIG. 6 is a plan of the base of a cylinder head of an engine of this invention;

FIG. 7 is an elevation of an electrode rod of an engine of this invention;

FIG. 8 is an elevation, with parts broken away, of one type of electrode used in an engine of this invention;

FIG. 9 is a view taken generally along line 9—9 of FIG. 8;

FIG. 10 is a cross-sectional view of a second type of electrode used in an engine of this invention;

FIG. 11 is a cross-sectional view similar to FIG. 5 showing the piston in its uppermost position;

FIG. 12 is a cross-sectional view similar to FIG. 5 showing an alternative cylinder used in an engine of this invention;

FIG. 12A is a cross-sectional view similar to FIGS. 5 and 12, but on a reduced scale and with parts broken away, showing an additional embodiment of a cylinder head used in an engine of this invention;

FIG. 14 is a schematic diagram of an alternative high-voltage ignition system for an engine of this invention;

FIG. 15 is a schematic diagram of an electronic switching unit for an engine of this invention;

FIG. 16 is a schematic diagram of a regulator/electronic switching unit for an engine of this invention;

FIGS. 17A–17D are schematic diagrams of a fuel mixer of the present invention;

FIGS. 19A–19E are schematic diagrams of a portion of the electrical circuitry of the fuel mixer shown in FIGS. 17A–17D;

Corresponding reference characters indicate corresponding parts throughout the several views of the drawings.

DESCRIPTION OF A PREFERRED EMBODIMENT

Figure 1:
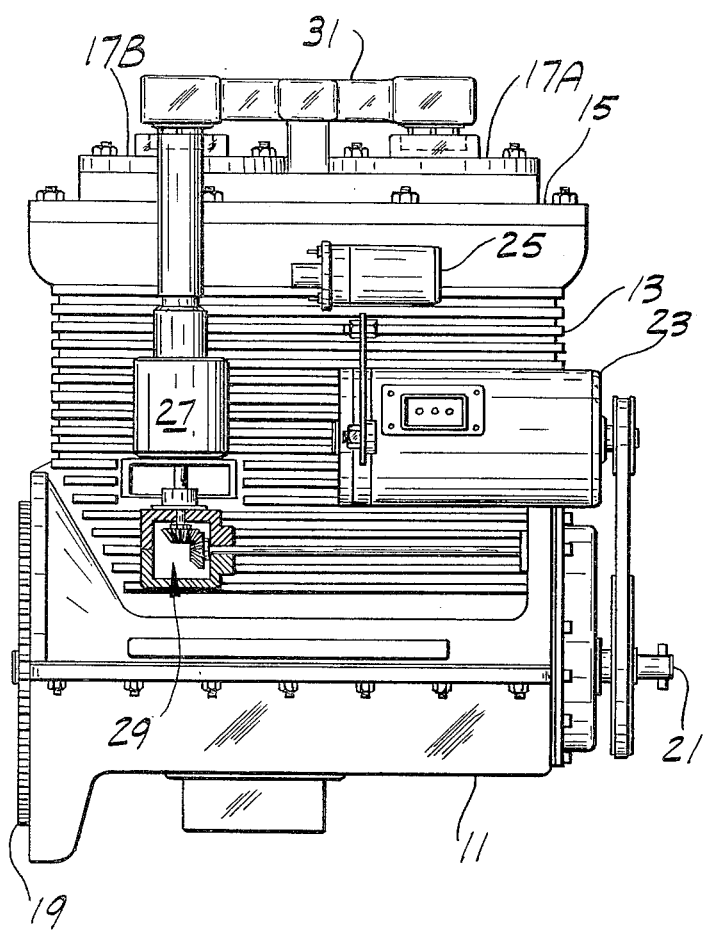
FIG. 1 is a side elevation of an engine of this invention.
Figure 2:
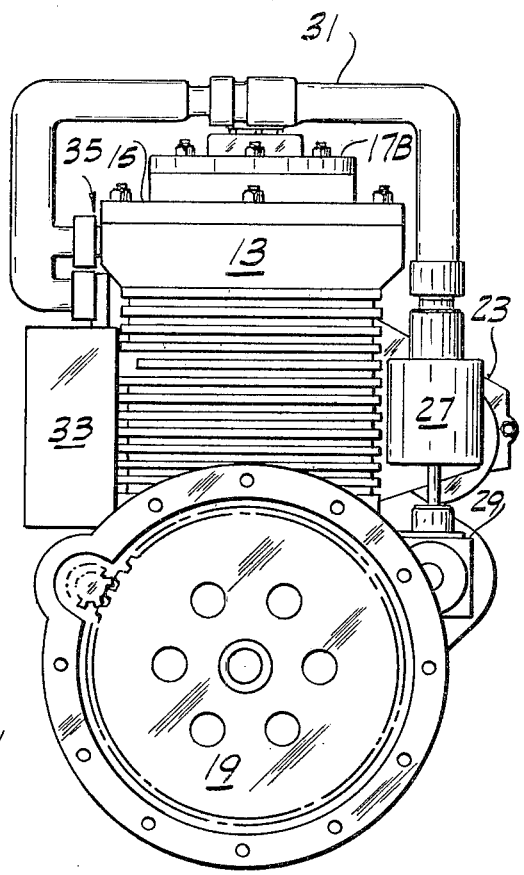
FIG. 2 is a rear elevation of an engine of this invention.
Figure 3:
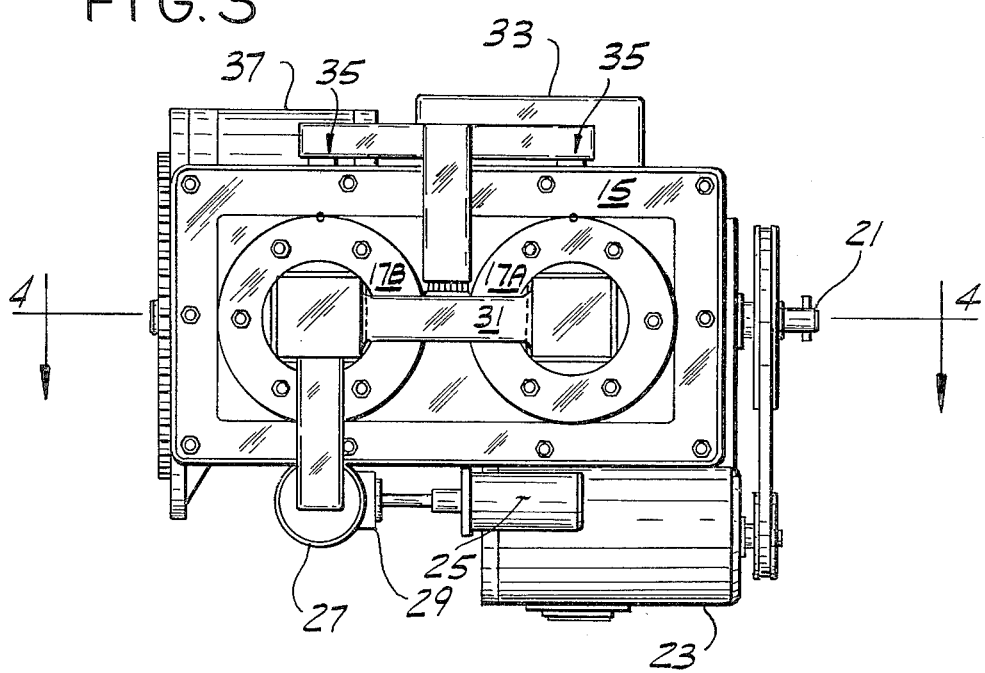
FIG. 3 is a top plan of an engine of this invention.

Referring to the drawings, there is shown in FIG. 1 a two-cylinder engine 11 comprising a block 13 preferably of a nonmagnetic material such as aluminum, a nonmagnetic head 15, and a pair of cylinder heads 17A and 17B of a magnetizable material such as 0.1–0.3% carbon steel. Also shown in FIG. 1 is a flywheel 19 attached to a crankshaft 21, a generator 23, a high-voltage coil 25, a distributor 27 attached by a gear arrangement shown in part at 29 to the crankshaft, and an electrical cable 31 which is connected to the distributor and to both cylinders. Cable 31 (see FIG. 2) is also electrically connected to a switching unit 33 which preferably comprises a plurality of silicon controlled rectifiers (SCRs) or transistors. Also shown in FIG. 2 is a second electrical connection of the cable to the cylinders, which connection is indicated generally at 35. Turning to FIG. 3, there is shown a starter motor 37 as well as a clearer view of the connections 35 to each cylinder.

Figure 4:
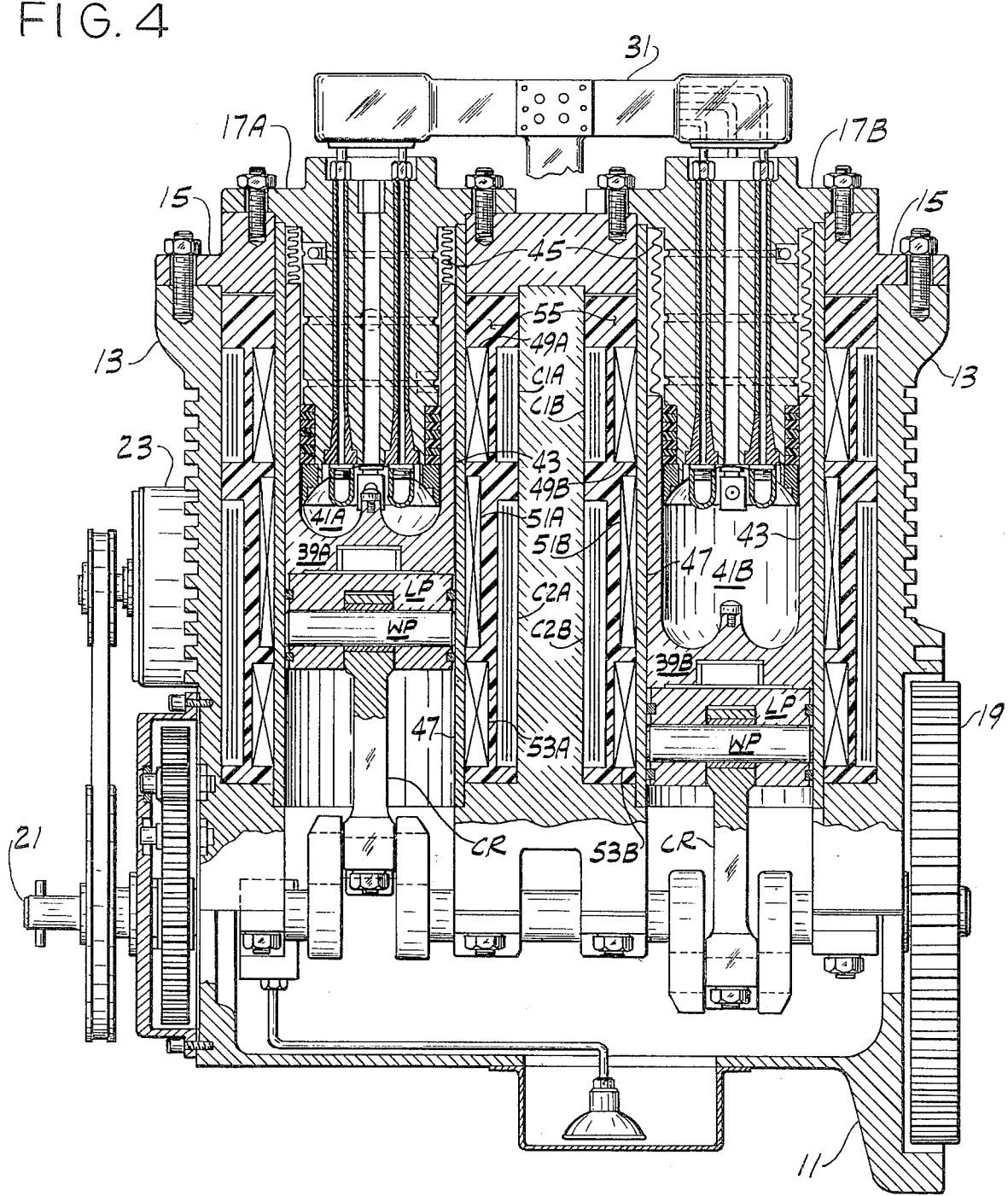
FIG. 4 is a cross-sectional view generally along line 4—4 of FIG. 3 of an engine of this invention.

A cross section of the engine is shown in FIG. 4. The cylinder heads have associated therewith pistons, designated 39A and 39B, respectively, the heads and pistons defining opposite ends of a pair of chambers or cylinders 41A and 41B respectively. The pistons are made of a magnetizable material. Although only two chambers are shown, the engine can include any number. It is preferred, however, for reasons set forth below, that there be an even number of cylinders. Pistons 39A and 39B move axially with respect to their correspoding heads from a first position (the position of piston 39A in FIG. 4) to a second position (the position of piston 39B) and back, each piston being suitably connected to crankshaft 21. As shown in FIG. 4, this suitable connection can include a connecting rod CR, a wrist pin WP, and a lower piston portion or power piston LP. The connecting rods and/or power pistons must be of non-magnetizable material. When a split piston is used, pistons 39A and 39B are suitably connected to lower piston portions LP by bolting, spring-loaded press fitting, or the like. Pistons 39A and 39B are attached 180° apart from each other with respect to the crankshaft so that when one piston is at top dead center (TDC) the other will be at bottom dead center (BDC) and vice versa. Additional pairs of cylinders may be added as desired but the pistons of each pair should be attached to the crankshaft 180° from each other. Of course, the relative position of each piston with respect to its respective head determines the volume of its chamber.

Integral with the piston bodies are walls 43 which form the walls of the chambers. Preferably, a set of air-tight bellows 45, of similar construction to that sold under the designation ME 197-0009-001 by the Belfab Company of Daytona Beach, Fla., are suitably secured between walls 43 and cylinder heads 17A and 17B respectively to form an airtight seal between each piston and its cylinder head. While walls 43 and piston 39 can be made of one magnetizable piece, a preferable and more efficient construction has walls 43 separate from piston 39 and made of a non-magnetizable material. The length of time that a given engine will run is a function of the efficacy of its sealing system. Means, such as bellows 45, for hermetically sealing the cylinders will optimize said length of time. Such a hermetic seal should be secured between walls 43 and cylinder heads 17 to form an airtight seal therebetween. This seal could be the airtight bellows system shown or some other sealing system such as an oil sealing system.

Cylinder bodies 47 (see FIG. 4), made of nonmagnetic material such as stainless steel, extend from the point of attachment of each bellows to its cylinder head to the base of the corresponding pistons, forming sleeves for each piston in which each piston moves. Three sets of electric coils 49A, 49B, 51A, 51B, and 53A, 53B, are wound around sleeves 47, and hence around chambers 41A and 41B, respectively, for generating magnetic fields in the chambers, said coils being generally coaxial with their respective chambers. Each of these coils has an inductance of approximately 100 mH. It is preferred that 14–19 gauge wire be used to wind these coils and that the coils be coated with a suitable coating, such as #9615 hardener from Furane Plastics, Inc., of Los Angeles, Calif. or the coating sold by the Epoxylite Corp. of South El Monte, Calif. under the trade designation Epoxylite 8683. Each chamber is also surrounded by a pair of capacitors, C1A, C1B and C2A, C2B wound therearound, capacitors C1A, C1B having a capacitance of approximately 1.3 micro-F and capacitors C2A, C2B having a capacitance of approximately 2.2 micro-F. The coils and capacitors are potted in hardened epoxy of fiberglass material 55. The epoxy resin and hardener sold under the designations EPI Bond 121 and #9615 hardener by Furane Plastics, supra, are satisfactory, but other epoxy material which will remain stable at temperatures up to 200° F. would probably also be acceptable. It is preferred that a small amount of graphite such as that sold under the trade designation Asbury 225 by Asbury Graphite, Inc. of Rodeo, Calif., be included in the epoxy potting to prevent nucelar particles formed in the chamber from escaping from the apparatus. Ten to 15% graphite to epoxy by weight is more than enough.

A typical cylinder is shown in section in FIG. 5, showing the piston in its fully extended position with respect to the head and showing many details on a somewhat larger scale than that of FIG. 4. A set of seals 57, made of a material such as that sold under the trade designation Teflon by the DuPont Company of Delaware, is disposed between the cylinder head and wall 43 to prevent escape of the working fluid from chamber 41. A filler tube 59 with a ball valve at its lower end is used in filling the chamber with the working fluid but is closed during operation of the engine.

The cylinder head has a generally concave depression therein, indicated at 61, which defines the top end of the chamber. A plurality of electrodes for exciting and igniting the working fluid extend through the cylinder head into the chamber. Two of those electrodes, shown in section in FIG. 5 and labelled 63 and 65, have tungsten points 75 (see infra), while the other two, labelled 67 and 69 (see FIG. 6 for electrode 69) are containers called, respectively, the anode and the cathode. The electrodes are generally equidistantly spaced from the axes of their chambers and are generally coplanar to each other, their mutual plane being perpendicular to the axes of their chambers. Each electrode is disposed 90° from adjacent electrodes in this embodiment and are generally disposed such that a line from the anode to the cathode and a line between the other two electrodes intersect at a focal point generally on the axis of the respective chamber. The radial distance of each electrode from the focal point is fixed for a reason discussed below. The general construction of electrodes 63 and 65 is shown in FIGS. 6–9. These electrodes include a conductive rod 71 (see FIG. 7) preferably of brass or copper; a conductive, generally rectangular plate 73 (see FIGS. 6, 8 and 9); and tungsten point 75 mounted in a conductive base 77 generally at right angles to the plate (see FIGS. 8 and 9).

The construction of the anode and cathode is shown in FIG. 10. Each includes a conductive rod 79 and a container 81. The cathode container is substantially pure aluminum. If desired, aluminum alloys with, e.g., less than 5% copper, 1% manganese and 2% magnesium may be used. In one embodiment, the cathode container contains approximately four grams of thorium-232 and is filled with argon. In this same embodiment the anode container is copper or brass and contains approximately two grams of rubidium-37 and approximately three grams of phosphorus-15 hermetically sealed in mineral oil. In a second embodiment, the cathode is still aluminum, but it contains at least two grams of rubidium-37 in addition to the approximately four grams of thorium-232 in either argon or mineral oil. In this second embodiment, the anode is also aluminum and contains at least 4 grams of phosphorus-15 and at least 2 grams of thorium-232 in argon or mineral oil. Alternatively, mesothorium may be used for the thorium, strontium-38 may be used for the rubidium, and sulfur-16 may be used for the phosphorus. Rods 71 and 79 respectively extend through cylinder head 17 to the exterior thereof where electrical connections are made to the electrodes. Each rod is surrounded by one of four insulating sleeves 83, the lower portion of each of which being flared outwardly to firmly seat in the cylinder head.

The piston has a generally semitoroidal depression in its upper surface (see FIGS. 4, 5 and 11) and carries a conductive discharge point 85 of copper, brass or bronze generally along the axis of the chamber. When the piston is generally extended, the discharge point is a substantial distance from the electrodes. But when the piston is in its upper position (see FIG. 11), the discharge point is disposed generally intermediate all four electrodes and in close proximity thereto, there being gaps between said electrodes and the discharge point. When the piston is in this upper position, the electrodes extend somewhat into the semitoroidal depression in the piston's upper surface and the chamber is generally toroidal in shape. The volume of the chamber shown in FIG. 11 can be from approximately 6.0 cubic inches (100 cm$^3$) or larger. Given the present state of the art, 1500 cubic inches (25,000 cm$^3$) appears to be the upper limit. A plurality of ports 87 and one-way valves 89 return working fluid which escapes from the chamber back thereto, so long as a sealing system such as bellows 45 is used.

An alternative cylinder head/piston arrangement is shown in FIG. 12. The main difference between this arrangement and that of FIG. 5 is that the chamber walls, here labelled 43' are integrally formed with the head. As a result seals 57 are carried by the piston rather than by the head, the attachment of bellows 45 is somewhat different, and the fluid-returning valves and ports are part of the piston rather than of the head. Otherwise these arrangements are substantially the same. Preferably, the cylinders of both arrangements are hermetically sealed.

An additional embodiment of a cylinder head/piston arrangement used in the present invention is shown in FIG. 12A. In this arrangement, a tapered sleeve 17C is disposed in mating relation between cylinder head 17 and piston 39, a plurality of seals 57 are provided, and electrodes 67 and 69 have a somewhat different shape. Moreover, in this embodiment a chamber 90 is provided in cylinder head 17 for storing additional working fluid, i.e., the purpose of chamber 90 is to extend the operating time between refueling by circulating the working fluid, viz. the mixture of inert gases described infra, between cylinder 41 and chamber 90 as needed so that the reactions in cylinder 41 are not adversely affected. To accomplish this, this embodiment further includes a two-way circulation valve 90B, a relief valve 90C, and duct or passageway 90D for evacuating and filling chamber 90, a duct or passageway 90E for evacuating and filling cylinder 41, a passageway 90F between chamber 90 and cylinder 41 in which two-way valve 90B is disposed, a sensor 90G and a plurality of small pressure relief holes 90H. Relief holes 90H serve to relieve the pressure on bellows 45 as the piston moves from BDC to TDC. In larger engines holes 90H should be replaced with one way valves. Two-way valve 90B is either controlled by sensor 90G or is manually operable, as desired, to allow the circulation of gases between chamber 90 and cylinder 41. The sensor itself detects a condition requiring the opening or closing of valve 90B and signals that condition to the valve. For example, sensor 90G can measure pressure in cylinder 41 while the piston is at top dead center. A predetermined cylinder pressure can cause a spring to compress, causing the valve to open or close as appropriate. A subsequent change in the cylinder pressure would then cause another change in the valve. Another sensor (not shown) could measure the physical location of the piston by a physical trip switch or an electric eye, or it could measure angular distance from top dead center on the distributor or the crankshaft. The sensor must keep the gas pressure in chamber 90 at one atmosphere ±5% and, at top dead center, cylinder 41 should also be at that pressure. If gas is lost from the system, it is more important to maintain the proper pressure in cylinder 41. Alternatively, a small passage between cylinder 41 and chamber 90 could function in a passive manner to satisfactorily accomplish the same result. From the above, it can be seen that this embodiment utilizes the hollowed out center of the cylinder head for storing additional working fluid, which fluid is circulated between chamber 90 and cylinder 41 through a valving system comprising valve 90B and sensor 90G with the moving piston causing the gases to circulate.

The electrical circuitry for engine 11 includes (see FIG. 13A) a 24 V battery B1, an ignition switch SW1, a starter swich SW2, starter motor 37, a main circuit switch SW4, a step-down transformer 93 (e.g., a 24 V to 3.5 V transformer), a switch SW6 for supplying power to ignition coil 25 (shown in FIGS. 13A and 13B as two separate ignition coils 25A and 25B), and various decoupling diodes.

Figure 13A:
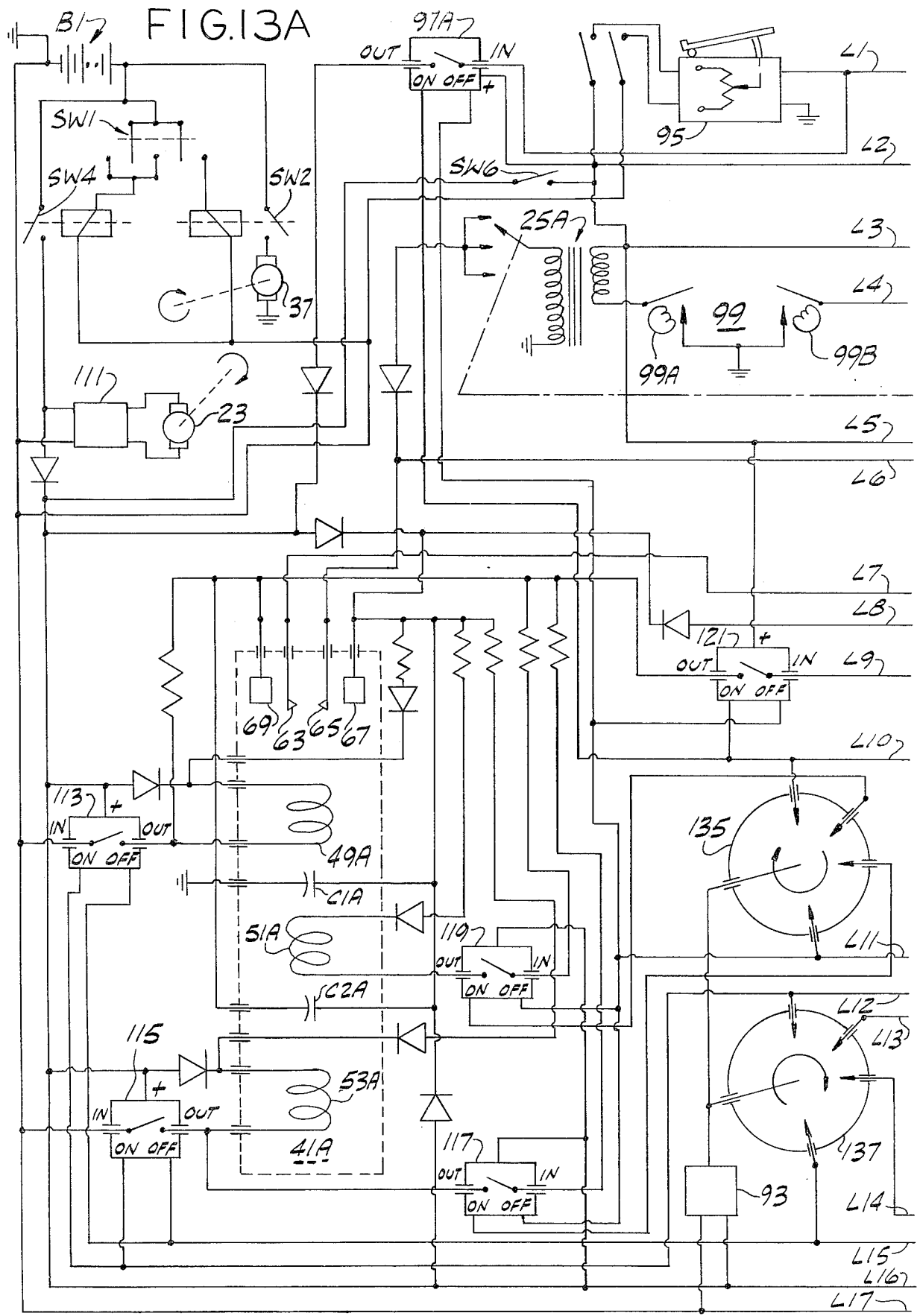
FIGS. 13A and 13B are schematic diagrams of the electrical circuitry for an engine of this invention.

The circuitry of FIG. 13A also includes a high frequency voltage source or oscillator 95 for supplying rapidly varying voltage through two electronic current regulators 97A, 97B (see FIG. 13B for regulator 97B) to the anode and cathode electrodes of each cylinder, and a high voltage distributor 99 for distributing 40,000 volt pulses to the cylinders. Distributor 99 has two wipers 99A and 99B and supplies three pulses to each cylinder per cycle. Wipers 99A and 99B are 180° out of phase with each other and each operates to supply pulses to its respective cylinder from TDC to 120° thereafter. More pulses are desirable and therefore a better distributor arrangement (shown in FIG. 14) may be used. The arrangement shown in FIG. 14 includes two ignition coils 101, 103, a simple distributor 105 and a pair of magnetic ignition circuits 107, 109, described below. Of course many other ignition systems could also be developed. For example, a single circuit might be used in place of circuits 107, 109, additional induction coils might be added to the ignition coils to assist in starting or a resistor could be added to the ignition coils to ensure a constant 40,000 volt output regardless of engine rpm. Moreover, a solid-state distributor could be used instead of the mechanical distributor labelled 99.

Referring back to FIG. 13A, for engines of more than 1000 hp a high frequency source 95 could be used to control engine RPM. The output frequency is controlled by a foot pedal similar to an accelerator pedal in a conventional automobile. The output frequency varies through a range of from approximately 2.057 MHz to approximately 27.120 MHz with an output current of approximately 8.4 amps. The speed of engine 11 is controlled by the output frequency of source 95. The high frequency current, as described infra, is directed to each cylinder in turn by circuitry described infra. For engines producing from 300 to 1000 hp (not shown), a high frequency source having a constant output of 27.120 MHz with a constant current of 3.4 amps which is continually supplied to all cylinders could be used. In this case an autotransformer, such as that sold under the trade designation Variac by the General Radio Company, controlled by a foot pedal varies the voltage to each cylinder from 5 to 24 volts d.c. at 4.5 amps, using power from the batteries or the alternator. The d.c. current from the Variac is switched from cylinder to cylinder by two small electronic switching units which in turn are controlled by larger electronic switching units. For the smallest engines (not shown), a high frequency generator could supply a constant output of 27.120 MHz with a constant current of 4.2 amps to the cylinders during starting only. Speed control would be achieved by a Variac as described above which controls the d.c. voltage supplied to the cylinders in turn within a range of from 5 to 24 volts at a current of 5.2 amps. In this case, once the engine is running, the full voltage needed to ignite the (smaller) quantity of gases is obtained from the electrodes in the other cylinder of the pair.

The circuitry of FIG. 13A also includes the generator, a voltage regulator and relay 111, five electronic switching units 113, 115, 117, 119 and 121, electrodes 63 and 65 associated with chamber 41A (hereinafter chamber 41A is sometimes referred to as the "A" cylinder and chamber 41B is sometimes referred to as the "B" cylinder), anode 67, cathode 69, magnetic coils 49A, 51A and 53A, capacitors C1A and C2A, and various decoupling diodes. The electronic switching units can take a variety of forms. For example, one simple form (see FIG. 15) includes a pair of SCRs 123 and 125. The switching unit is connected at terminal IN to the corresponding line on the input side and at terminal OUT to the corresponding line on the output side. When a voltage of 3.5 volts is supplied from the battery through a distributor, for example, to the ON terminal, SCR 125 conducts, thereby completing a circuit through the switching unit. Conversely, when 3.5 volts is applied to the OFF terminal, SCR 123 conducts and the circuit is broken. Likewise, the circuit for regulators 97A and 97B (see FIG. 16) includes two SCRs 127 and 129 and a PNP transistor 131. In this circuit when SCR 127 is gated on, it forces transistor 131 into conduction, thereby completing the circuit through the regulator. When SCR 129 is gated on, the circuit through transistor 131 is broken. A number of other configurations may be used in place of those of FIGS. 15 and 16 and not all would use SCRs. For example, one triode could be used to replace two main SCRs, or transistors could be used instead of SCRs.

A pair of low-voltage distributors 135 and 137 are also shown in FIG. 13A. Distributors 135 and 137 provide gating pulses for the electronic switching units of FIGS. 13A and 13B. Of course, solid-state distributors could also replace mechanical distributors 135 and 137.

Figure 13B:
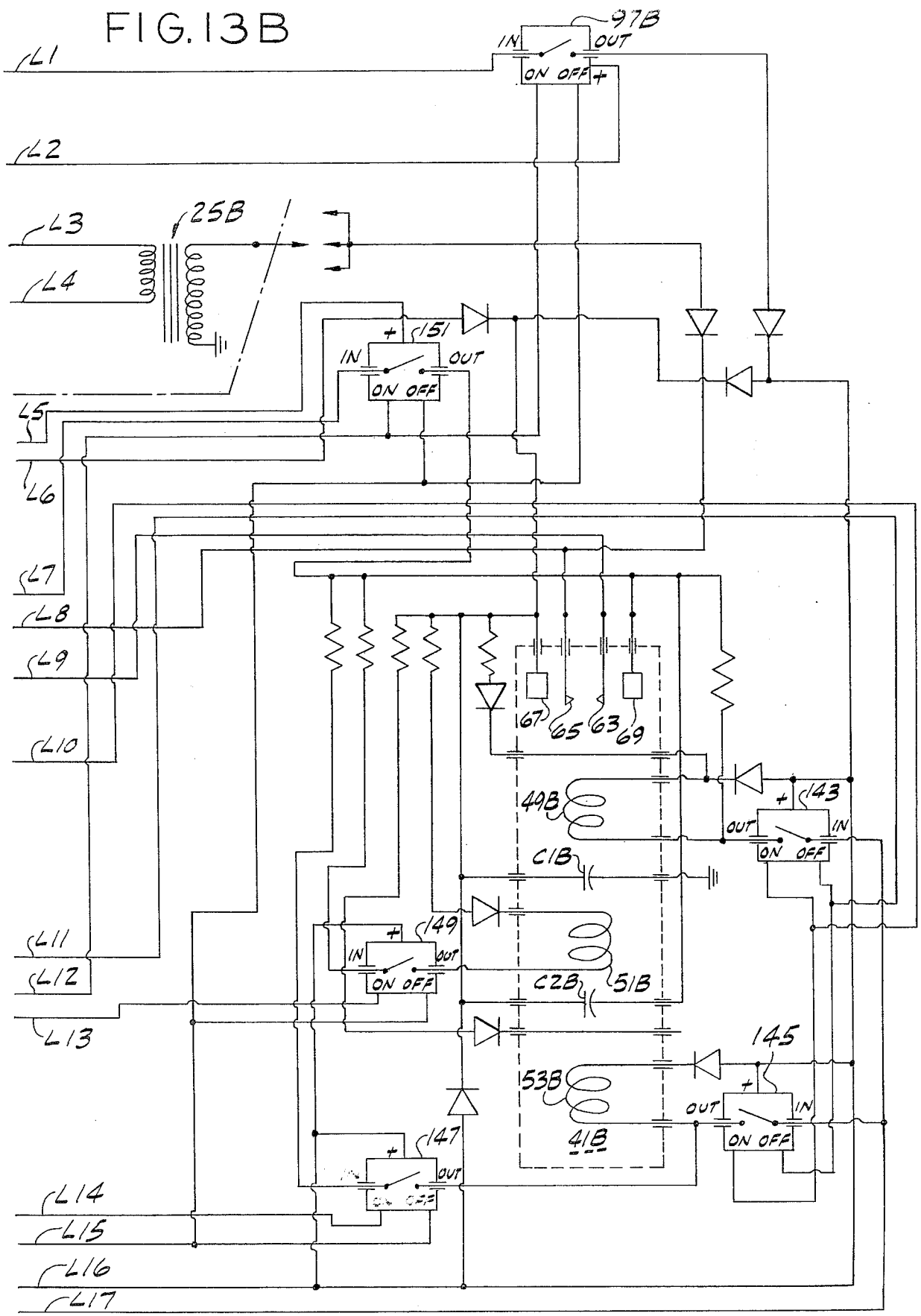

In addition, the engine circuitry includes (see FIG. 13B) five electronic switching units 143, 145, 147, 149 and 151 corresponding to units 113, 115, 117, 119 and 121 of FIG. 13A, electrodes 63 and 65 of the "B" cylinder, anode 67, cathode 69, electric coils 49B, 51B and 53B, capacitors C1B and C2B, and various decoupling diodes. The circuitry of FIG. 13B is generally the same as the corresponding portions of FIG. 13A, so the description of one for the most part applies to both. Of course, if more than two cylinders are used, each would have associated therewith circuitry such as that shown in FIGS. 13A and 13B. The circuitry of FIG. 13A is connected to that of FIG. 13B by a plurality of line L1–L17.

The working fluid and the fuel for the engine are one and the same and consist of a mixture of inert gases, which mixture consists essentially of helium, neon, argon, krypton and xenon. It is preferred that the mixture contain 35.6% helium, 26.3% neon, 16.9% argon, 12.7% krypton, and 8.5% xenon by volume, it having been calculated that this particular mixture gives the maximum operation time without refueling. Generally, the initial mixture may contain, by volume, approximately 36% helium, approximately 26% neon, approximately 17% argon, approximately 13% krypton, and approximately 8% xenon. This mixture results from a calculation that equalizes the total charge for each of the gases used after compensating for the fact that one inert gas, viz. randon, is not used. The foregoing is confirmed by a spectroscopic flashing, described infra, that occurs during the mixing process. If one of the gases in the mixture has less than the prescribed percentage, it will become over-excited. Similarly, if one of the gases has more than the prescribed percentage, that gas will be under-excited. These percentages do not vary with the size of the cylinder.

Operation of the engine is as follows: At room temperature, each cylinder is filled with a one atmosphere charge of the fuel mixture of approximately 6 cubic inches (100 cm$^3$)/cylinder (in the case of the smallest engine) by means of filler tube 59. The filler tubes are then plugged and the cylinders are installed in the engine as shown in FIG. 4, one piston being in the fully extended position and the other being in the fully retracted position. To start the engine, the ignition and starter switches are closed, as is switch SW6. This causes the starter motor to crank the engine, which in turn causes the wiper arms of the distributors to rotate. The starting process begins, for example, when the pistons are in the positions shown in FIG. 4. Ignition coil 25 and distributor 99 (see FIG. 13A) generate a 40,000 volt pulse which is supplied to electrode 65 of chamber 41A. Therefore, a momentary high potential exists between electrodes 63 and 65 and the plates on each. The discharge point on piston 39A is adjacent these electrodes at this time and sparks occur between one or more of the electrodes and the discharge point to partially excite, e.g. ionize, the gaseous fuel mixture.

The gaseous fuel mixture in cylinder 41A is further excited by magnetic fields set up in the chamber by coil 49A. This coil is connected to the output side of electronic switching unit 121 and, through switching unit 113, to the battery and the generator. At this time, i.e., between approximately 5° before TDC and TDC, distributor 135 is supplying a gating signal to unit 121. Any current present on the input side of unit 121, therefore, passes through unit 121 to energize coil 49A. Moreover, high frequency current from oscillator 95 is supplied via regulator 97A to coil 49A. This current passes through regulator and relay 97A because the gating signal supplied from distributor 135 to unit 121 is also supplied to relay 97A. The current from switching unit 121 and from oscillator 95 also is supplied to the anode and the cathode. It is calculated that this causes radioactive rays (x-rays) to flow between the anode and the cathode, thereby further exciting the gaseous mixture.

As the starter motor continues cranking, piston 39A begins moving downward, piston 39B begins moving upward, and the wiper arms of the distributors rotate. (Needless to say, a solid-state distributor would not rotate. The distributor could utilize photo cells, either light or reflected light, rather than contact points.) After 45° of rotation, distributor 135 supplies a gating pulse to electronic switching unit 119, thereby completing a circuit through unit 119. The input to unit 119 is connected to the same lines that supply current to coil 49A. The completion of the circuit through unit 119, therefore, causes coil 51A to be energized in the same manner as coil 49A. After an additional 45° of rotation, distributor 135 gates on electronic switching unit 117 which completes a circuit to the same lines. The output terminal of unit 117 is connected to coil 53A, and so this coil is energized when unit 117 is gated on. All three coils of the "A" cylinder remain energized and, therefore, generating magnetic fields in chamber 41A until piston 39A reaches BDC.

As piston 39A moves from TDC to BDC, two additional 40,000 volt pulses (for a total of three) are supplied from distributor 99 to the "A" cylinder. These pulses are spaced approximately 60° apart. If more pulses are desired, the apparatus shown in FIG. 14 may be used. In that case, the solenoids indicated generally at 107A, 107B and 109A, 109B are energized to create a number of rapid, high-voltage pulses which are supplied as indicated in FIG. 14 to the cylinders, distributor 105 operating to supply pulses to only one of the pair of cylinders at a time.

As piston 39A reaches BDC, distributor 135 sends a pulse to the OFF terminals of electronic switching units 121, 117 and 119, respectively, causing all three coils 49A, 51A and 53A to be deenergized. At about the same time, i.e., between approximately 5° prior to TDC and TDC for piston 39B, distributor 137 supplies a gating pulse to the ON terminals of electronic switching units 113 and 115. The power inputs to units 113 and 115 come from the generator through regulator 111 and from the battery, and the outputs are directly connected to coils 49A and 53A. Therefore, when units 113 and 115 are gated on, coils 49A and 53A are reenergized. But in this part of the cycle, the coils are energized with the opposite polarity, causing a reversal in the magnetic field in chamber 41A. Note that coil 51A is not energized at all during this portion of the cycle. Capacitors C1A and C2A are also charged during the BDC to TDC portion of the cycle. (During the TDC to BDC portion of the cycle, these capacitors are charged and/or discharged by the same currents as are supplied to the anode and cathode since they are directly connected thereto.)

As piston 39A moves upward, electrodes 63 and 65 serve as pick-up points in order to conduct some of the current out of chamber 41A, this current being generated by the excited gases in the chamber. Said current is transferred via line L7 to electronic switching unit 151. The same gating pulse which gated on units 113 and 115 was also supplied from distributor 137 via line L12 to gate on switching unit 151, so the current from the electrodes of chamber 41A passes through unit 151 to the anode, cathode and capacitors of chamber 41B, as well as through switching units 147 and 149 to coils 49B, 51B and 53B. Thus it can be seen that electricity generated in one cylinder during a portion of the cycle is transferred to the other cylinder to assist in the excitation of the gaseous mixture in the latter. Note that this electricity is regulated to maintain a constant in-engine current. It should be noted that twenty four volts from the generator is always present on electrodes 63 and 65 during operation to provide for pre-excitement of the gases.

From the above it can be seen that distributors 135 and 137 in conjunction with electronic switching units 113, 115, 117, 119, 121, 143, 145, 147, 149 and 151 constitute means for individually energizing coils 49A, 49B, 51A, 51B, 53A and 53B. More particularly they constitute means operable to energize all the coils of a given cylinder from the other cylinder when the first cylinder's piston is moving from TDC to BDC and operable to energize only two (i.e., less than all) of the coils from the alternator when that piston is moving from BDC to TDC. Additionally, these components constitute means for energizing the coils with a given polarity when the piston of that cylinder is moving from TDC to BDC and for energizing the first and third coils with the opposite polarity when that piston is moving from BDC to TDC.

As can also be seen, switching units 121 and 151 together with distributors 135 and 137 constitute means for closing a circuit for flow of current from chamber 41A to chamber 41B during the BDC to TDC portion of the cycle of chamber 41A and for closing a circuit for flow of current from chamber 41B to chamber 41A during the TDC to BDC portion of the cycle of chamber 41A. Oscillator 95 constitutes means for supplying a time varying electrical voltage to the electrodes of each cylinder, and oscillator 95, distributors 135 and 137, and regulators 97A and 97B together constitute means for supplying the time varying voltage during a predetermined portion of the cycle of each piston. Moreover, distributor 99 together with ignition coils 25A and 25B constitute means for supplying high voltage pulses to the cylinders at predetermined times during the cycle of each piston.

The cycle of piston 39B is exactly the same as that of piston 39A except for the 180° phase difference. For each cylinder, it is calculated that the excitation as described above causes the gases to separate into layers, the lowest atomic weight gas in the mixture, namely helium, being disposed generally in the center of each chamber, neon forming the next layer, and so on until we reach xenon which is in physical contact with the chamber walls. The input current (power) to do this is the calculated potential of the gas mixture. Since helium is located in the center of the chamber, the focal point of the electrode discharges and the discharges between the anode and cathode is in the helium layer when the piston is near TDC. As the piston moves slightly below TDC, the electrons from electrodes 63 and 65 will no longer strike the tip of the piston, but rather will intersect in the center of the cylinder (this is called "focal point electron and particle collision") as will the alpha, beta and gamma rays from the anode and cathode. Of course, the helium is in this exact spot and is heavily ionized at that time. Thus the electrodes together with the source of electrical power connected thereto constitute means for ionizing the inert gas. It is calculated that as a result of all the aforementioned interactions, an ignition discharge occurs in which the helium splits into hydrogen in a volume not larger than 2 or 3 times $10^{-6}$ cubic millimeters at a temperature of approximately 100,000,000° F. Of course this temperature is confined to a very small space and the layering of the gases insulates the cylinder walls therefrom. Such heat excites adjacent helium such that a plasma occurs. Consequently, there is a minute fusion reaction in the helium consisting of the energy conversion of a single helium atom, which releases sufficient energy to drive the piston in that chamber toward BDC with a force similar in magnitude to that generated in a cylinder of a conventional internal combustion engine. Electrodes 63 and 65 extend into the argon layer while each piston is in its BDC to TDC stroke so as to pick up some of the current flowing in that layer. It may take a cycle or two for the gases in the cylinders to become sufficiently excited for ignition to occur.

Once ignition does occur, the electrical operation of the engine continues as before, less the operation of the starter motor. Distributor 99 supplies three pulses per cycle (or more if the magnetic ignition system of FIG. 14 is used) to each cylinder; and distributors 135 and 137 continue to supply "on" and "off" gating pulses to the electronic switching units. The rpm of the engine is, as explained above, governed by the frequency of the current from oscillator 95 (or in the case of smaller horsepower units, by the dc voltage supplied to the cylinders from the aforementioned Variac).

Because of the minute amount of fuel consumed in each cycle, it is calculated that a cylinder can run at 1200 rpm approximately 1000 hours, if not more, on a single charge of gas. Note that even at 1200 rpm, there will be intense heat occurring only 0.002% of the time. This means that input power need be applied only sporadically. And this power can be supplied to a cylinder from the other cylinder of its pair by means of electronic switching units which, in the case of SCRs, are themselves triggered by low voltage (e.g. 3.5 V) current. Thus, since electrical power generated in one cylinder is used to excite the gases in the other cylinder of a pair, it is practical that the cylinders be paired as discussed above. Condensers are, of course, used to store such energy for use during the proper portion of the cycle of each cylinder.

From the above, it should be appreciated that the engine of this invention has several advantages over presently proposed fusion reactors, such as smaller size, lower energy requirements, etc. But what are the bases of these advantages? For one, presently proposed fusion reactors use hydrogen and its isotopes as a fuel instead of inert gases. Presumably this is because hydrogen requires less excitement power. While this is true, the input power that is required in order to make hydrogen reactors operate makes the excitation power almost insignificant. For example, to keep a hydrogen reactor from short circuiting, the hydrogen gas has to be separated from the reactor walls while it is in the plasma state. This separation is accomplished by the maintenance of a near vacuum in the reactor and by the concentration of the gas in the center of the reactor (typically a toroid) by a continuous, intense magnetic field. Accordingly, separation requires a large amount of input energy.

In the present invention, on the other hand, the greater excitation energy of the fuel is more than compensated for by the fact that the input energy for operation can be minimized by manipulation of the unique characteristics of the inert gases. First, helium is the inert gas used for fusion in the present invention. The helium is primarily isolated from the walls of the container by the layering of the other inert gases, which layering is caused by the different excitation potential (because of the different atomic weights) of the different inert gases, said excitation being caused by the action of the electrodes, anode and cathode in a magnetic field. This excitation causes the gases each to be excited in inverse proportion to their atomic numbers, the lighter gases being excited correspondingly more. Helium, therefore, forms the central core with the other four gases forming layers, in order, around the helium. The helium is secondarily isolated from the walls of the container by a modest vacuum (in comparison to the vacuum in hydrogen reactors) which is caused partially by the "choking" effect of the coils and partially by the enlargement of the combustion chamber as the piston moves from TDC to BDC. (Unexcited, the gases are at one atmosphere at TDC.) Second, argon, the middle gas of the five, is a good electrical conductor and becomes an excellent conductor when (as explained infra) it is polarized during the mixing process. By placing the electrodes such that they are in the argon layer, electrical energy can be tapped from one cylinder for use in the other. During a piston's movement from BDC to TDC, the gases are caused to circulate in the cylinder by the change in the polarity of the coils, which occurs at BDC. During such circulation, the gases remain layered, causing the argon atoms to be relatively close to each other, thereby optimizing the conductivity of the argon. This conductivity optimization is further enhanced by a mild choking effect that is due to the magnetic fields. The circulation of the highly conductive argon results in a continuous cutting of the magnetic lines of force so that the current flows through the electrodes. This production of electricity is similar to the rotating copper wire cutting the magnetic lines of force in a conventional generator except that the rotating copper wire is replaced by the rotating, highly conductive argon. The amount of electricity that can be produced in this manner is a function of how many magnetic field lines are available to be cut. If one of the coils, or all three of the coils or two adjacent coils were energized, there would be only one field with electricity produced at each end. By energizing the top and the bottom coil, two separate fields are produced, with electricity produced at four points. A five coil system, if there were sufficient space, would produce three fields with the top, bottom and middle coils energized. Six points for electricity production would result. The number of coils that can be installed on a given cylinder is a function of space limitations. The recombination of gas atoms during the BDC to TDC phase causes the radiation of electrical energy which also provides a minor portion of the electricity that the electrode picks up. Additional non-grounded electrodes in each cylinder would result in more electricity being tapped off. It should be noted that during the BDC to TDC phase, the anode and the cathode are also in the argon layer and, like the electrodes, they pick up electricity, which charges the capacitors around the cylinder. Third, inert gases remain a mixture and do not combine because of the completeness of the electron shells. They are therefore well suited to a cycle whereby they are continually organized and reorganized. Fourth, as the helium atoms are consumed, the other gases have the capacity to absorb the charge of the consumed gas so that the total charge of the mixture remains the same.

The second basis of these advantages of the present engine over proposed fusion reactors concerns the fact that hydrogen reactors develop heat which generates steam to turn turbines in order to generate electrical power. This requires tremendous input energy on a continuous basis. The present invention operates on a closed cycle, utilizing pistons and a crankshaft which does not require a continuous plasma but rather an infrequent, short duration ($10^{-6}$ second) plasma that therefore requires much less input energy. In the present invention, a plasma lasting longer than $10^{-6}$ second is not necessary because sufficient pressure is generated in that time to turn the engine. A plasma of longer duration could damage the engine if the heat were sufficiently intense to be transmitted through the inert gas layers to the cylinder walls. A similar heat buildup in the engine can occur if the repetition rate is increased. Such an increase can be used to increase the horsepower per engine size but at the cost of adding a cooling system, using more expensive engine components, and increasing fuel consumption. Note that even though layers of inert gases insulate the cylinder walls, there might be some slight increase in the temperature of the gas layers after a number of cycles, i.e., after a number of ignitions.

Whereas hydrogen fusion reactors cannot directly produce power by driving a piston (because of the required vacuum), the present invention uses the layered inert gases to transmit the power from the plasma to each gas in turn until the power is applied to a piston, which can easily be translated into rotary motion. The layered gases also cushion the piston from the full force of the ignition. Moreover, the fields inside the cylinder undergoing expansion cause the gases to shrink, thereby taking up some of the pressure generated by the explosion and preventing rupturing of the cylinder walls.

Turning now to FIGS. 17A–17D, there is shown apparatus 201 for preparing the fuel mixture for engine 11. For convenience apparatus 201 is called a mixer although it should be understood that the apparatus not only mixes the gases which form the fuel but also performs many other vital functions as well. The five constituent inert gases are introduced in precise, predetermined proportions. The mixer extracts, filters and neutralizes the non-inert gases and other contaminants which may be found in the gas mixture. It also increases the potential capacity of gas atoms, discharges the krypton and xenon gases, polarizes the argon gases, ionizes the gases in a manner such that the ionization is maintained until the gas has been utilized and otherwise prepares them for use as a fuel in engine 11. In particular, the mixer makes the gases easier to excite during operation of the engine. Mixing does not mean an atomic or molecular combination or unification of gases because inert gases cannot chemically combine, in general, due to the completeness of the outer shell of electrons. During mixing, the various gases form a homogeneous mixture. The mixing of the five inert gases in apparatus 201 is somewhat analogous to preparing a five part liquid chemical mixture by titration. In such a mixture, the proportions of the different chemicals are accurately determined by visually observing the end point of each reaction during titration. In apparatus 201, a visible, spectroscopic flash of light accompanies the desired end point of the introduction of each new gas as it reaches its proper, precalculated proportion. (Each gas has its own distinctive, characteristic, spectroscopic display.) The ends points are theoretically calculated and are determined by pre-set voltages on each of a group of ionizing heads, described infra, in the apparatus.

Mixer 201 includes (see FIG. 17A) an intake port, indicated generally at 203, which during operation is connected to a source 205 of helium gas, a gauge 206, glass tubing 207 comprising a plurality of branches B10–B25 for flow of the gases through the mixer, a plurality of valves V1–V11 in the branches, which valves may be opened or closed as necessary, three gas reservoirs 209, 211 and 213 for storing small quantities of helium, argon and neon gas respectively, an ionizing and filtering unit 215 for filtering undesired non-inert gases and contaminants out of the fuel mixture, for regulating the gas atom electron charge and to absorb the free flowing electrons, a gas flow circulation pump 217, two ionizing heads 219 and 221, and three quality control and exhaust valves V12–V14. The mixer also comprises (see FIG. 17B) a high frequency discharge tube 225, a non-directed cathode ray tube 227, two more ionizing heads 229 and 231, two additional gas reservoirs 233 and 235 for storing small quantities of xenon and krypton, a quadruple magnetic coil 237, a plurality of valves V15-V24, valves V23 and V24 being quality control and exhaust valves, and a plurality of additional glass tubing branches B26-B32.

Figure 17A:
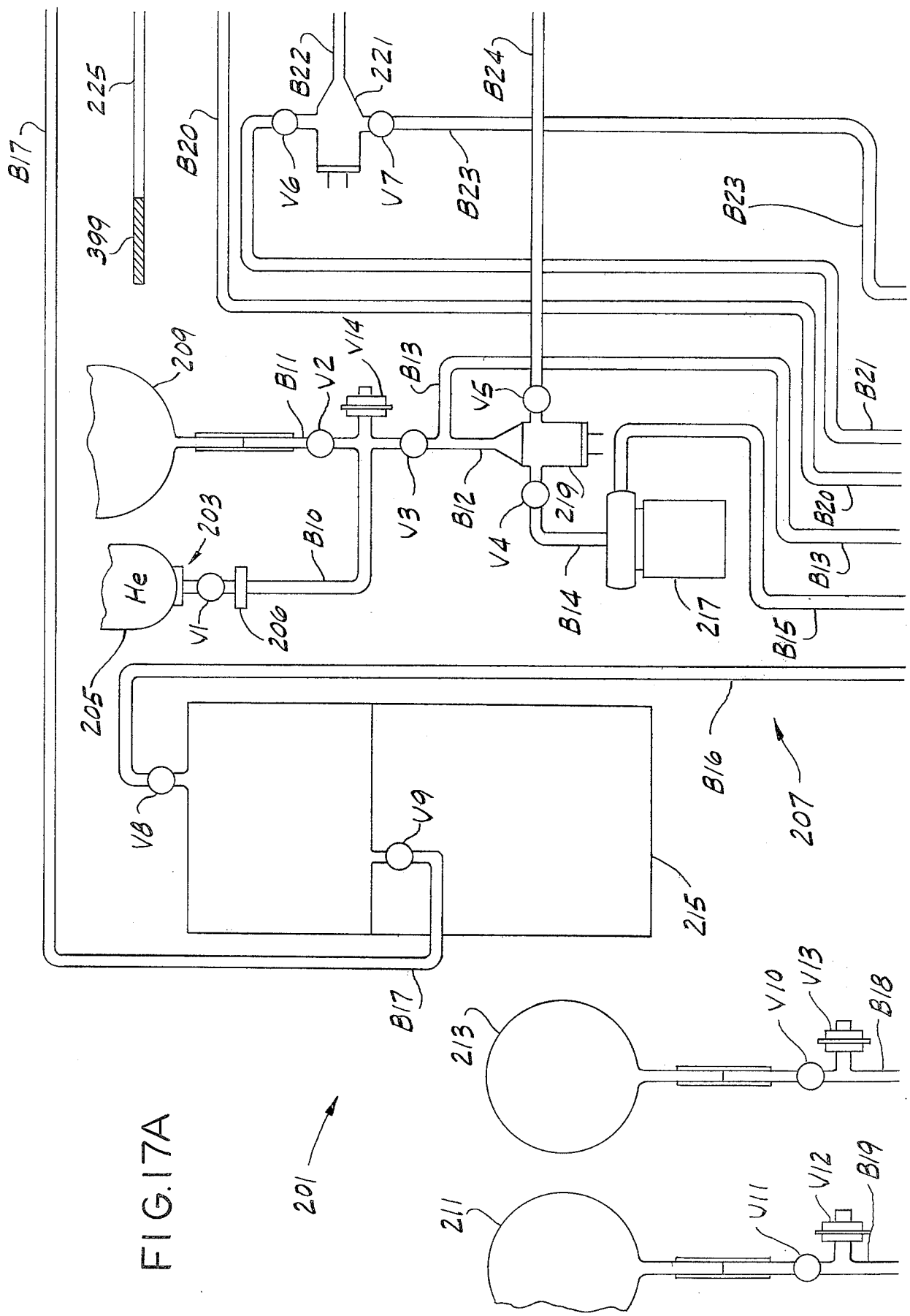
Figure 17B:
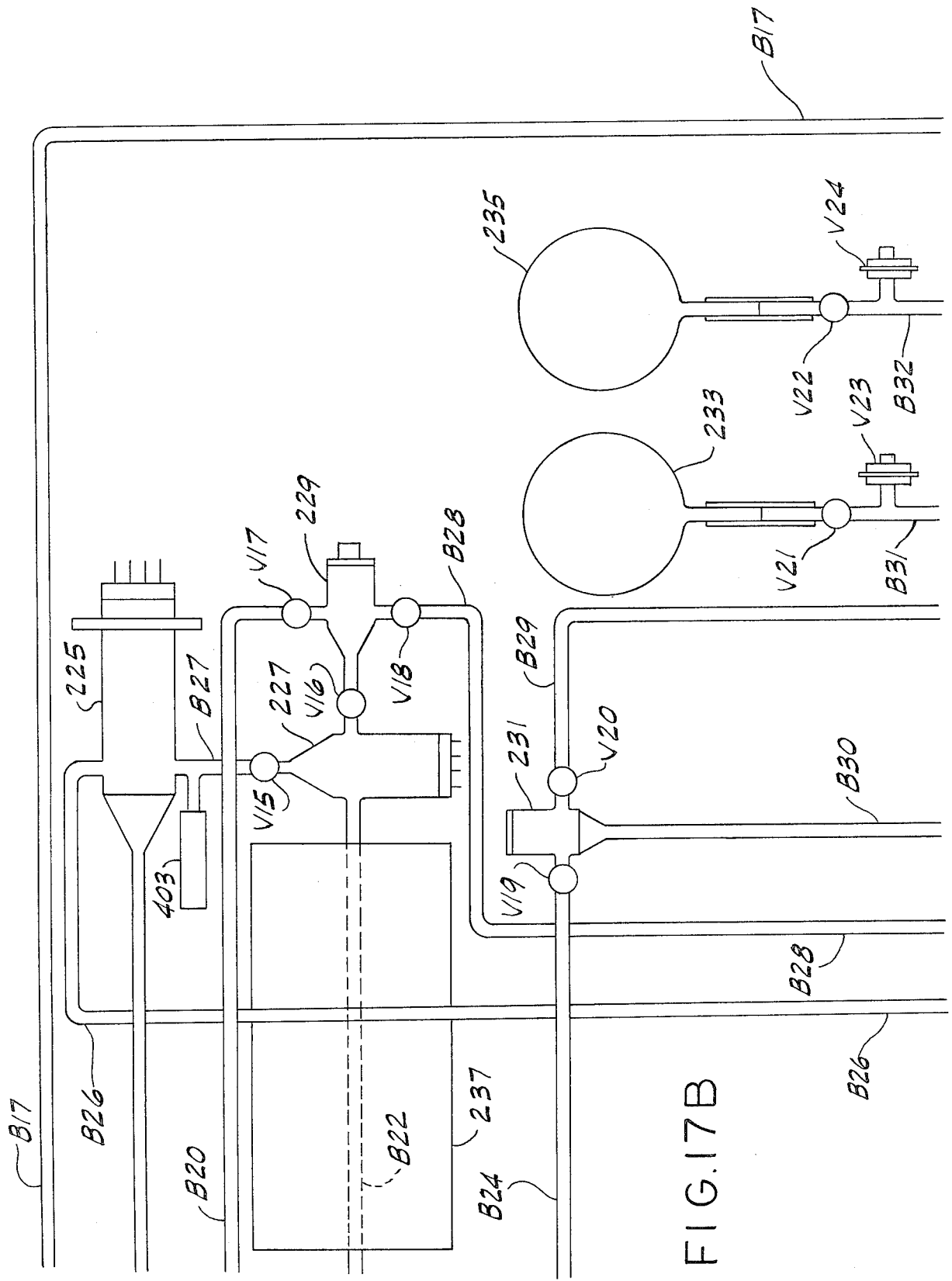
Figure 17C:
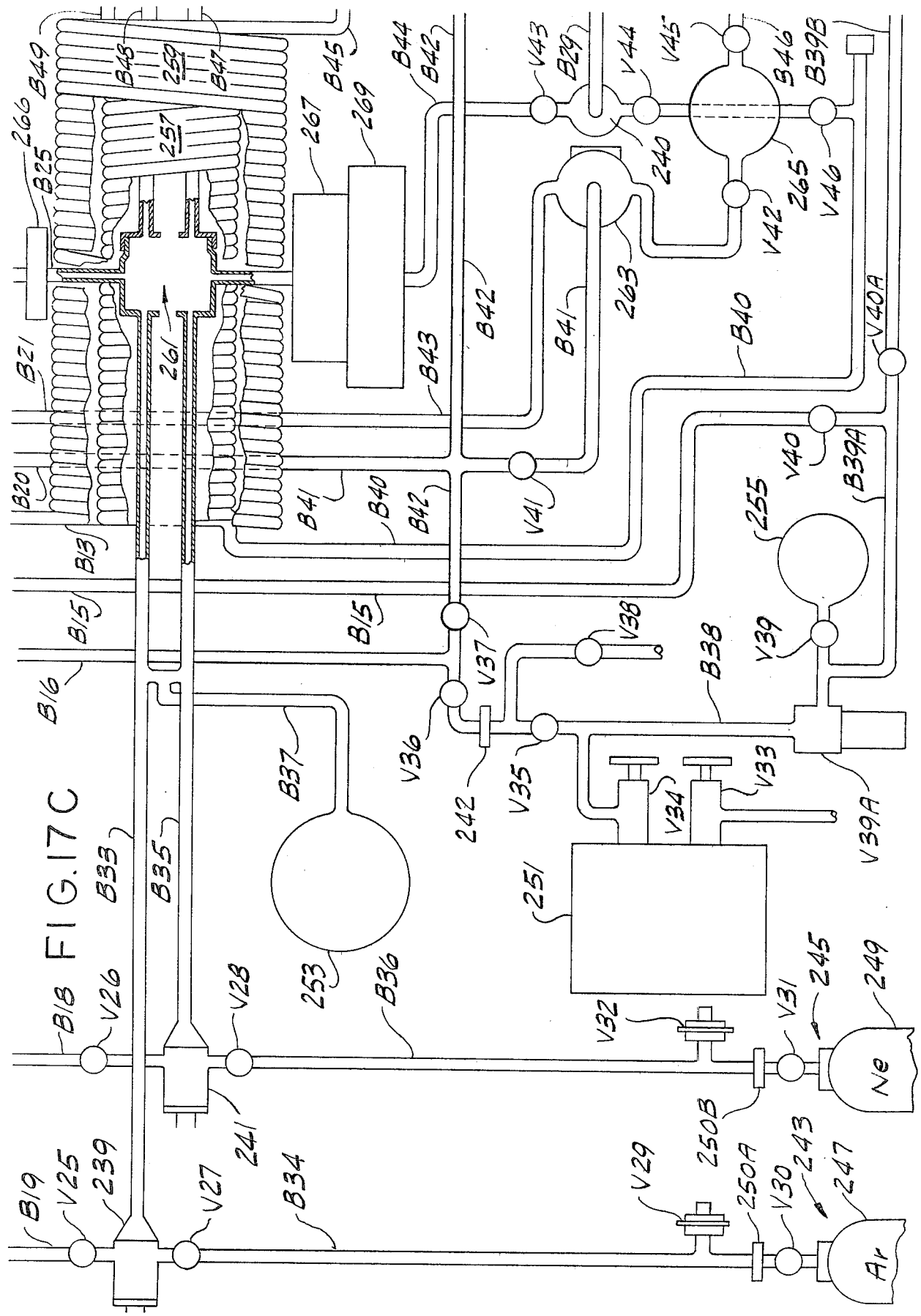

Turning to FIG. 17C, mixer 201 also includes additional ionizing heads 239, 240 and 241, additional valves V25-V46, V39A and V40A, valves V29 and V32 being quality control and exhaust valves and valve V39A being a check valve, a vacuum and pressure gauge 242 between valves V35 and V36, tubing branches B34-B49 (branch B39 consisting of two parts B39A and B39B), a pair of intake ports 243 and 245 which during operation are connected to sources 247 and 249 of argon and neon gas respectively, gauges 250A and 250B, a spark chamber 251, a hydrogen and oxygen retention chamber 253 containing No. 650 steel dust in a silk filter, an ion gauge 255 (which can be an RG 75K type Ion Gauge from Glass Instruments, Inc. of Pasadena, Calif.) for removing excess inert gases from the mixture, inner and outer coils of glass tubing 257 and 259 surrounding a mixing chamber 261, a focused x-ray tube 263 for subjecting the mixture flowing therethrough to 15-20 millirem alpha radiation and 120-125 millirem beta radiation, a directed cathode ray tube 265, two twin parallel magnetic coils 266 and 267, and a focusing magnetic coil 269. It is important that coils 266 and 267 be immediately adjacent mixing chamber 261. And (see FIG. 17D) the mixer also comprises three more ionizing heads 271, 273 and 275, two entry ports 277 and 279 which during operation are connected to sources 281 and 283 of krypton and xenon respectively, gauges 284A and 284B, a high frequency discharge tube 285, a twin parallel magnetic coil 287 surrounding a polarizer 289 for polarizing the argon, said polarizer containing fine steel particles which are polarized by coils 287 and which in turn polarize argon, a second hydrogen retention chamber 291, a pair of tubing branches B50 and B51, two filters 293 and 295 and a plurality of valves V47-V59, valves V57 and V59 being quality control and exhaust valves.

Figure 18:
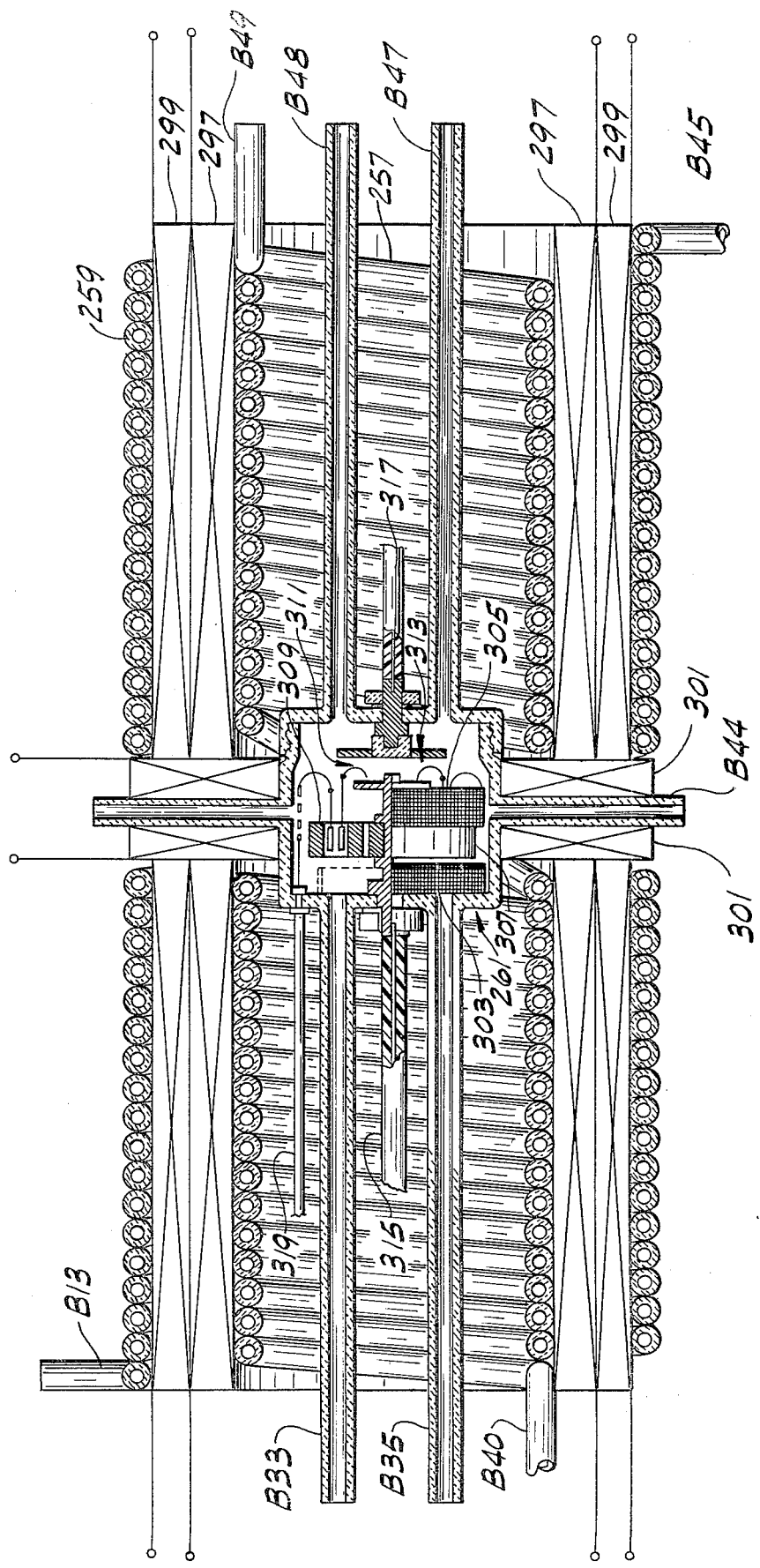
FIG. 18 is a schematic diagram of the mixing chamber portion of the fuel mixer shown in FIGS. 17A–17D.

Inner and outer glass tubing coils 257 and 259 and mixing chamber 261 are shown in cross section in FIG. 18. Intermediate glass coils 257 and 259 are two magnetic coils 297 and 299 having an inductance of approximately 130 mH. A yoke coil 301 is semicircularly disposed around mixing chamber 261. Inside mixing chamber 261 are located a pair of screens 303 and 305, insulators 307 and 309, and a pair of spark gaps indicated generally at 311 and 313. A high frequency amplitude modulated source provides 120 V ac., 60 Hz, 8.4 amp, 560 watt, 27,120 to 40,000 MHz±160 KHz current via heavily insulated wires 315 and 317 to the chamber. These wires are about twelve gauge, like those used as spark plug wires on internal combustion engines. Additionally 95 V direct current is supplied thereto via a smaller (e.g. sixteen to eighteen gauge) insulated wire 319. As described below, the gases to be mixed and prepared flow through chamber 261 and are suitably treated therein by the action of the various fields present in the chamber.

Figure 19A:
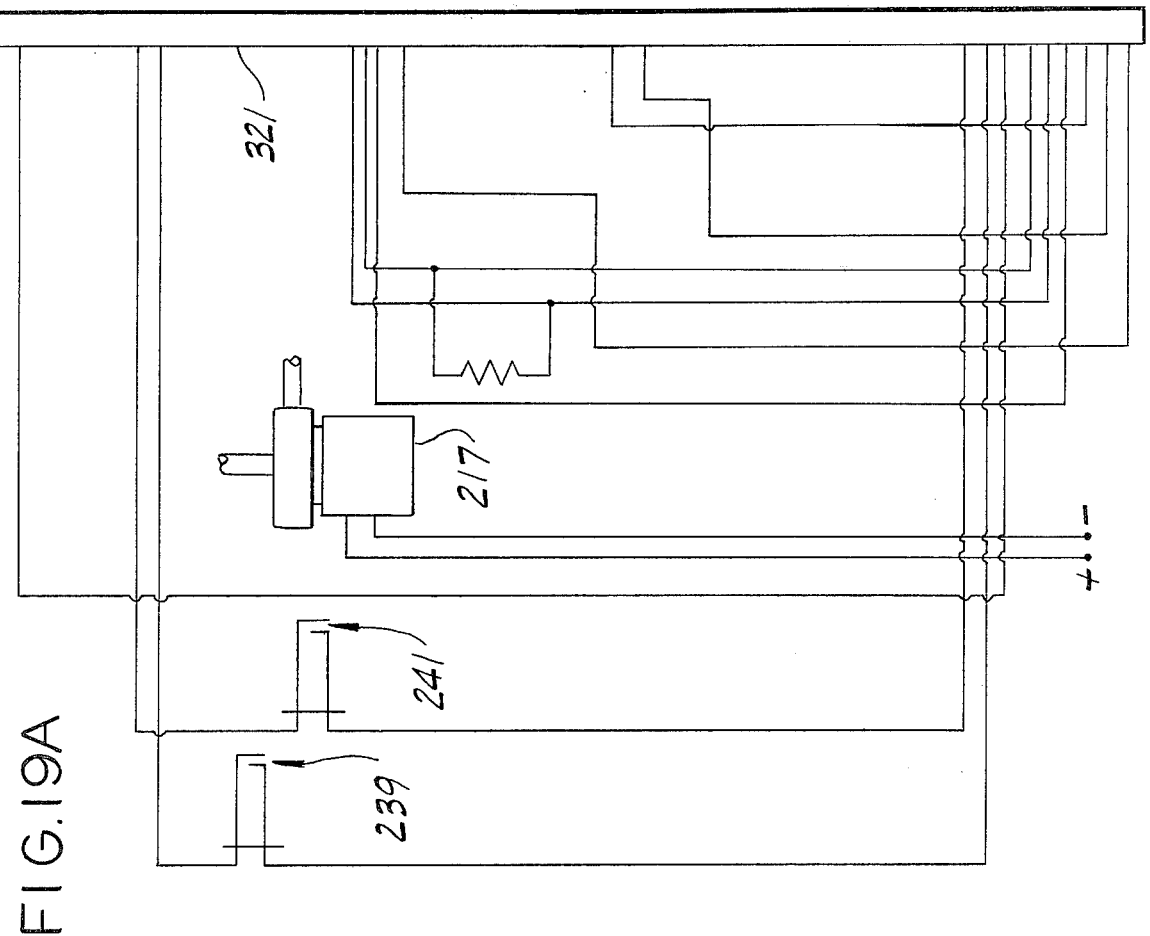
Figure 19B:
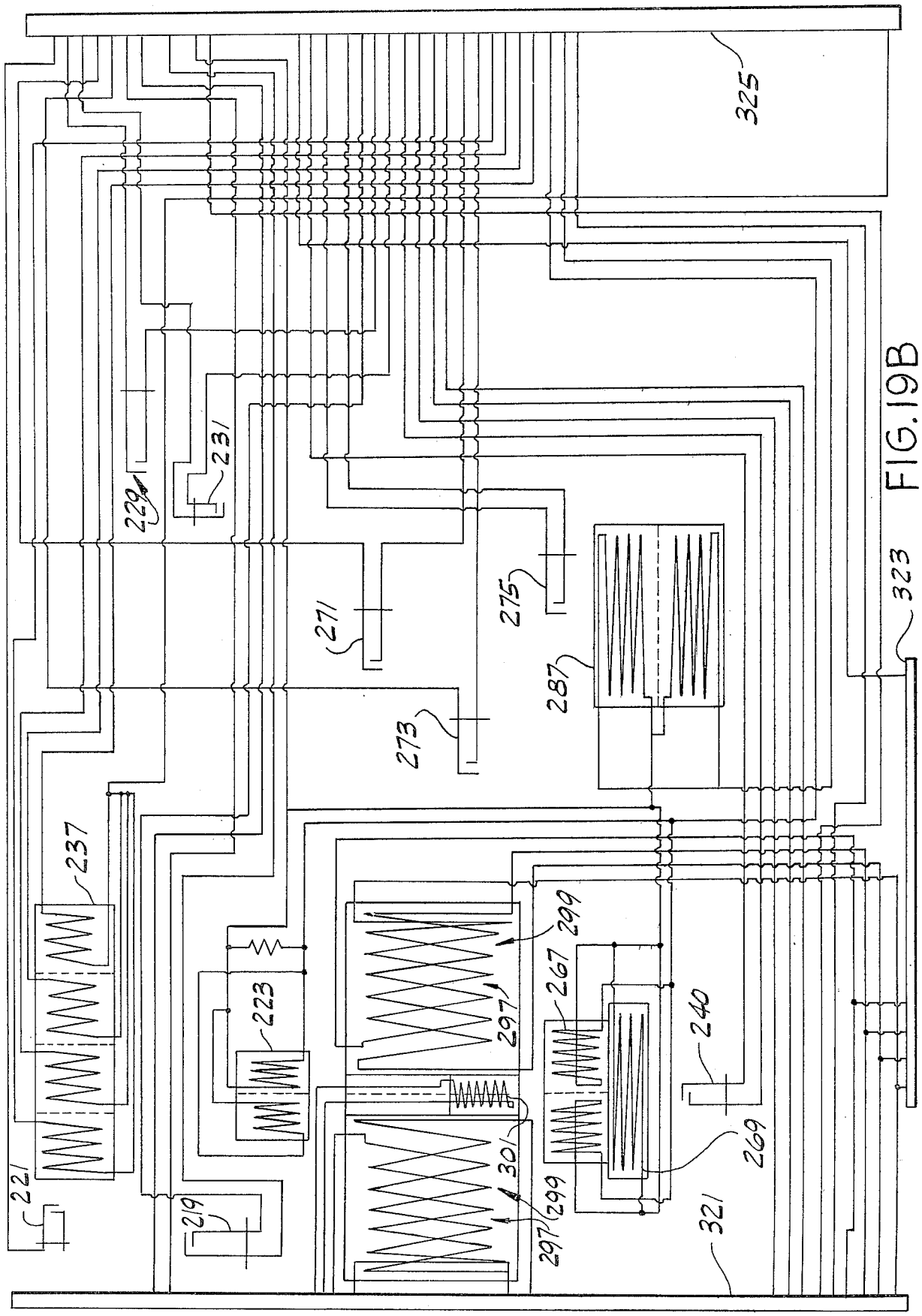

The magnetic coils, ionization heads, and pump 217, along with the required electrical interconnections, are schematically shown in FIGS. 19A-19E. More particularly, heads 239 and 241 are shown in FIG. 19A, as is pump 217. Each ionizing head has two electrodes with a gap therebetween to cause ionization of gases flowing through said head, the electrodes being connected to a source of electrical power. Pump 217 is directly connected to a source of power (either a.c. or d.c. as required by the particular pump being used). The connections between the circuitry on FIG. 19A and that on FIG. 19B are shown as a plug 321, it being understood that this plug represents a suitable one-to-one connection between the lines of FIG. 19A and those of FIG. 19B.

Figure 19D:
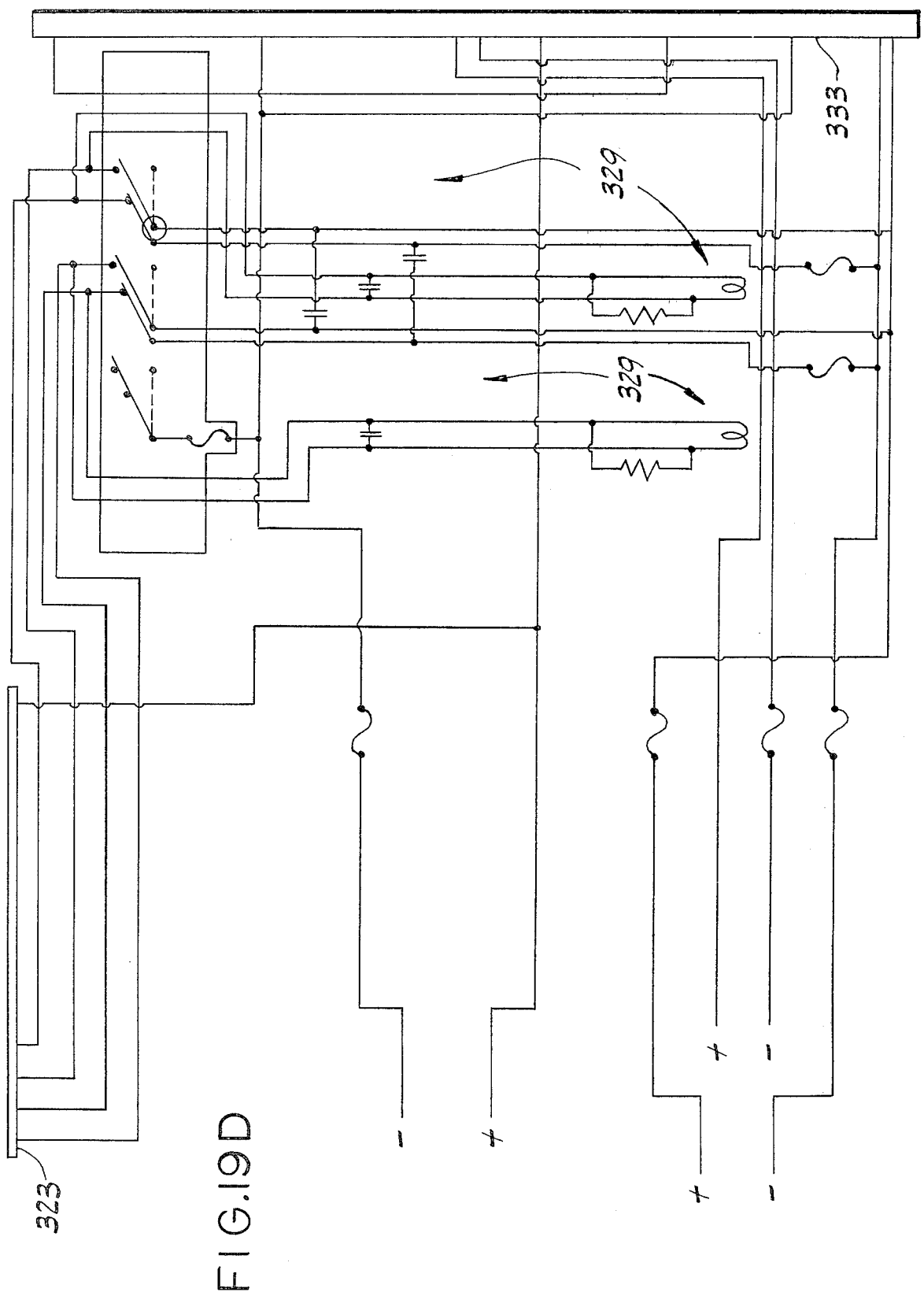

The remaining ionizing heads and all the magnetic coils are shown in FIG. 19B. For clarity, the coils are shown in an unconventional form. Quadruple coil 237 (shown at the top of FIG. 19B) has one side of each winding connected in common but the other sides are connected to different lines. Coil 223 consists of two windings in parallel. Coils 297 and 299, the ones around the mixing chamber, are shown overlapping, it being understood that coil 297 is actually interior of coil 299. Yoke coil 301, as shown, extends half-way from the bottom to the top of coils 297 and 299. Twin parallel magnetic coils 267 are connected in parallel with each other, both sides of focusing coil 269 being connected to one node of coils 267. Likewise coils 287 are connected in parallel. The connections between the lines of FIGS. 19B and those of FIGS. 19C and 19D are shown as plugs 323 and 325, although other suitable one-to-one connections could certainly be made. FIG. 19C shows the interconnecting lines between FIGS. 19B and 19E. A plug 327 or other suitable one-to-one connections connects the lines of FIGS. 19C and 19E.

Figure 19E:
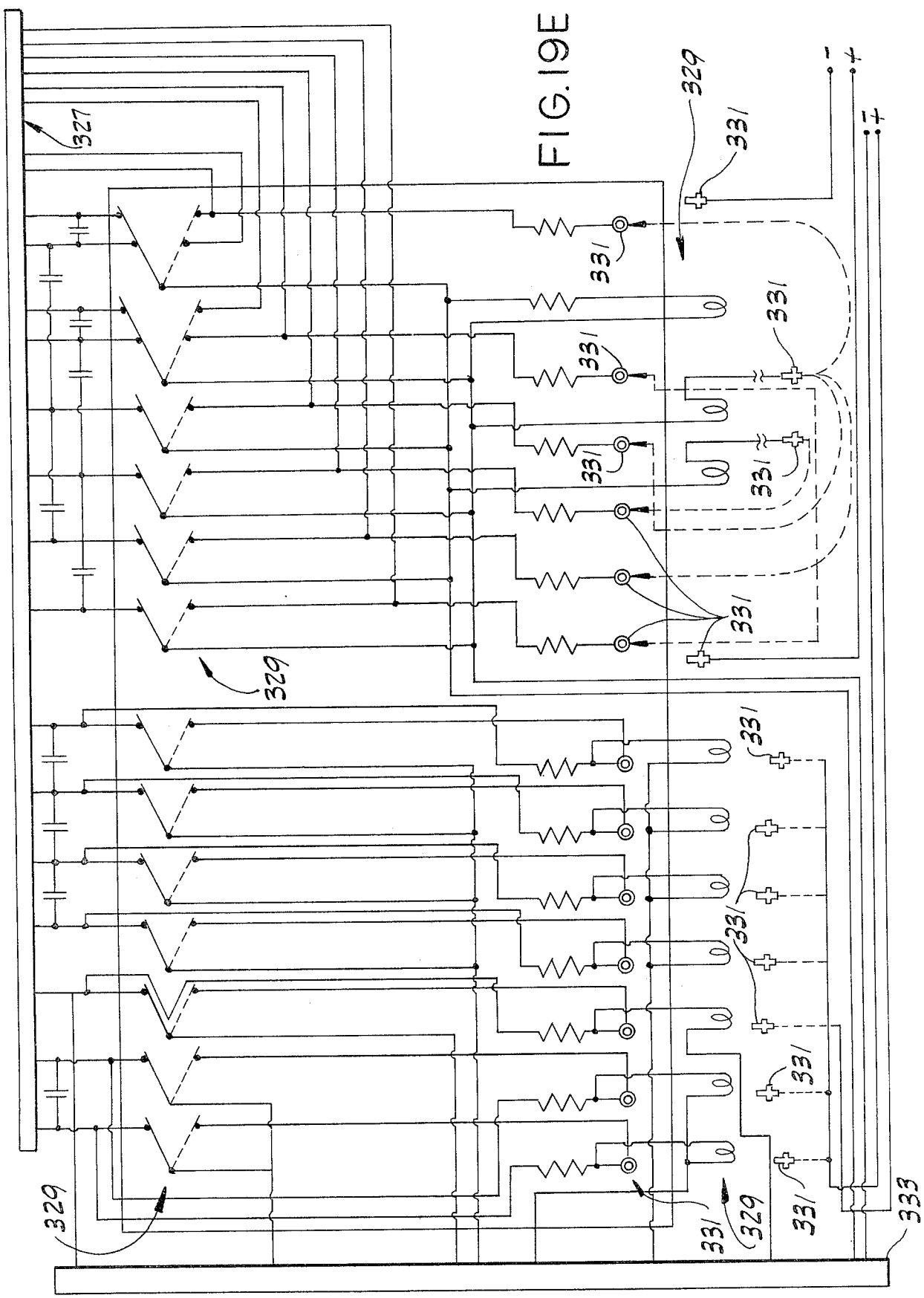

A plurality of power sources, like the above-mentioned Variacs, of suitable voltages and currents as well as a plurality of relays 329, and plugs 331 are shown on FIGS. 19D and 19E. The connections between these two Figs. is shown as a plug 333. It should be appreciated that the Variacs can be adjusted by the operator as necessary to supply the desired voltages to the aforementioned coils and ionizing heads. It should also be realized that the desired relays can be closed or opened as needed by connecting or disconnecting the two parts of the corresponding plug 331. That is, by use of plugs 331, the operator can control the energizing of the ionizing heads and magnetic coils as desired. Plugs 331 are also an aid in checking to ensure that each component is in operating condition just prior to its use. Of course, the manipulation of the power sources and the relays need not be performed manually; it could be automated.

The remaining circuitry for the mixer is shown on FIGS. 20A-20F. For convenience, plugs 335, 337, 339, 341, 343, 345 and 347 are shown as connecting the circuitry shown in the various Figs., although other suitable one-to-one connections may be used. The chassis of the apparatus is shown on these Figs. in phantom and is grounded. The power supply for the apparatus is shown in part on FIGS. 20A and 20D and includes an input 349 (see FIG. 20D) which is connected to 120 V, 60 Hz power during operation and an input 351 which is connected to the aforementioned high frequency generator or some other suitable source of approximately 27,120 MHz current. The power supply includes a pair of tuners 353, numerous RLC circuits, a triode 355, a pentode 357 with a ZnS screen, a variable transformer 359, an input control 361, a second variable transformer 363 (see FIG. 20A) which together with a filter 365 forms a 2.0 volts (peak-to-peak) power supply 367, a pentode 369, a variable transformer 371, and a resistor network indicated generally at 373. Exemplary voltages in the power supply during operation are as follows: The anode of triode 355 is at 145 V, the control grid at 135

V and the cathode at −25 V. The voltage at the top of the right-hand winding of transformer 359 is −5 V. The anode of pentode 357 is at 143 V, the top grid is grounded (as is the ZnS screen), the bottom grid is connected to transformer 359, and the control electrode is at 143 V. The input to supply 367 is 143 volts ac while its output, as stated above, is 2 V (peak-to-peak). The anode of pentode 369 is at 60 V, the grids at −1.5 V, the control electrode at 130 V, and the cathode is substantially at ground. And the output of resistor network 373, labelled 375, is at 45 V.

Figure 20A:
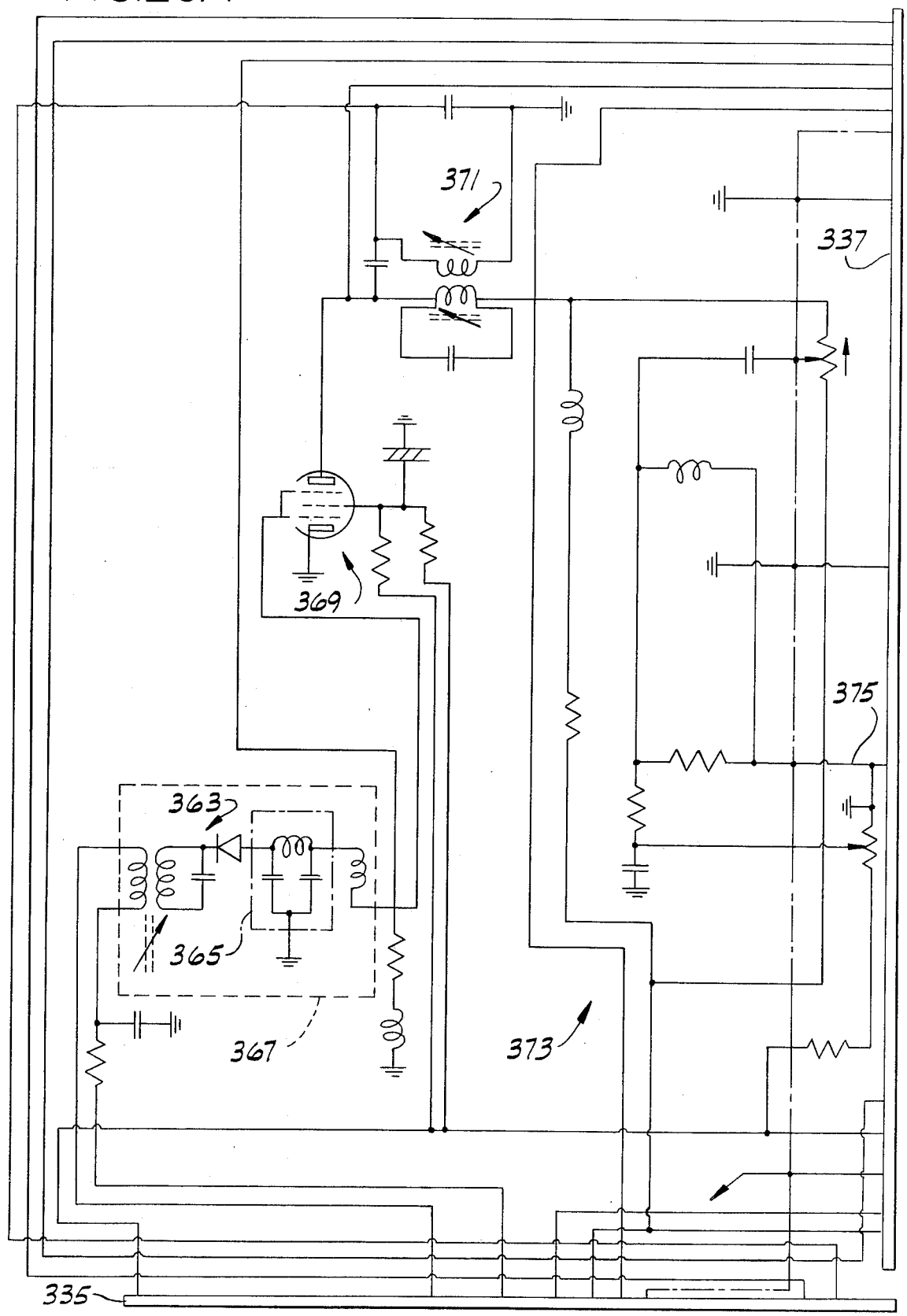
FIGS. 20A–20F are schematic diagrams of the rest of the electrical circuitry of the fuel mixer shown in FIGS. 17A–17D.
Figure 20B:
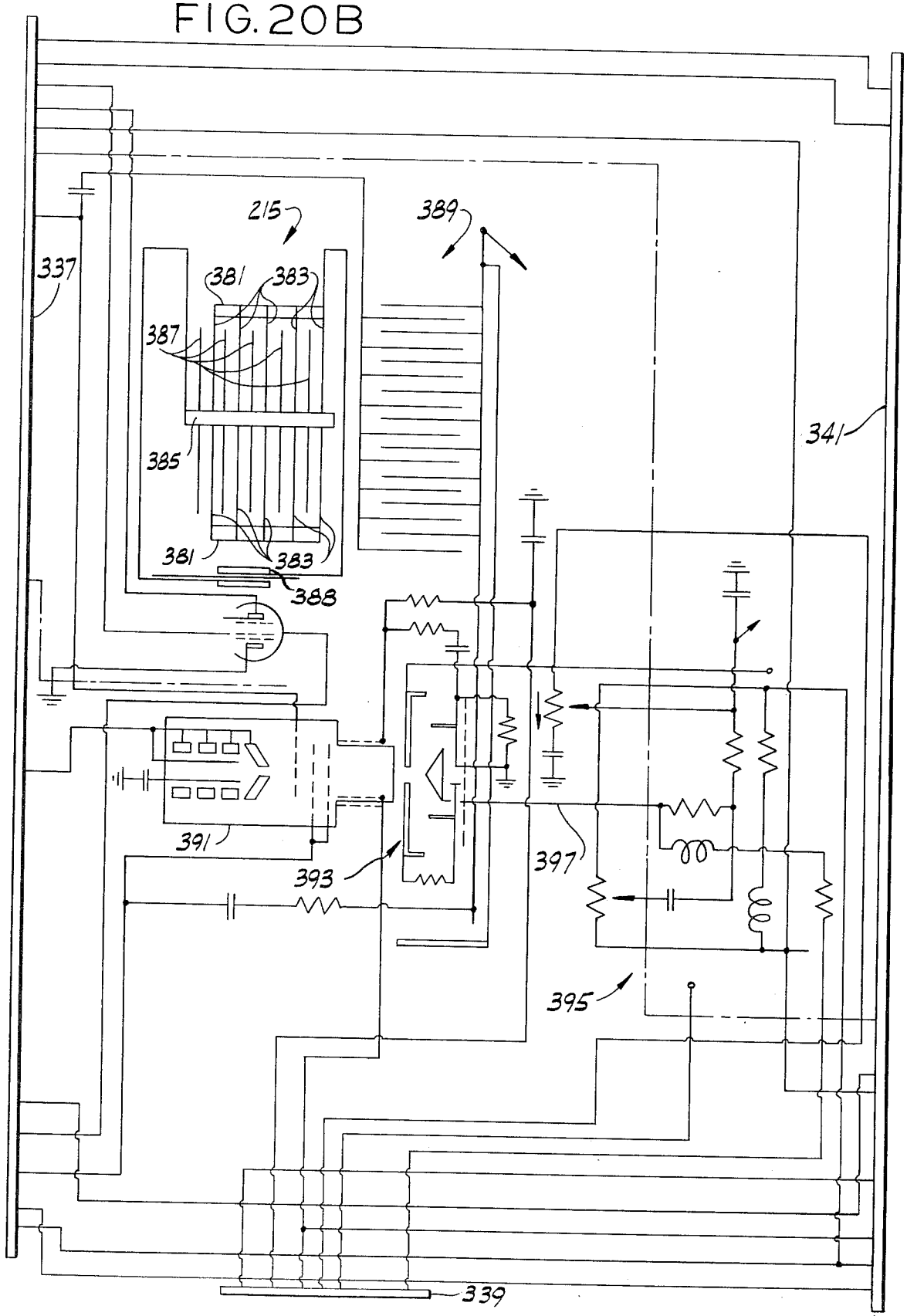
Figure 20C:
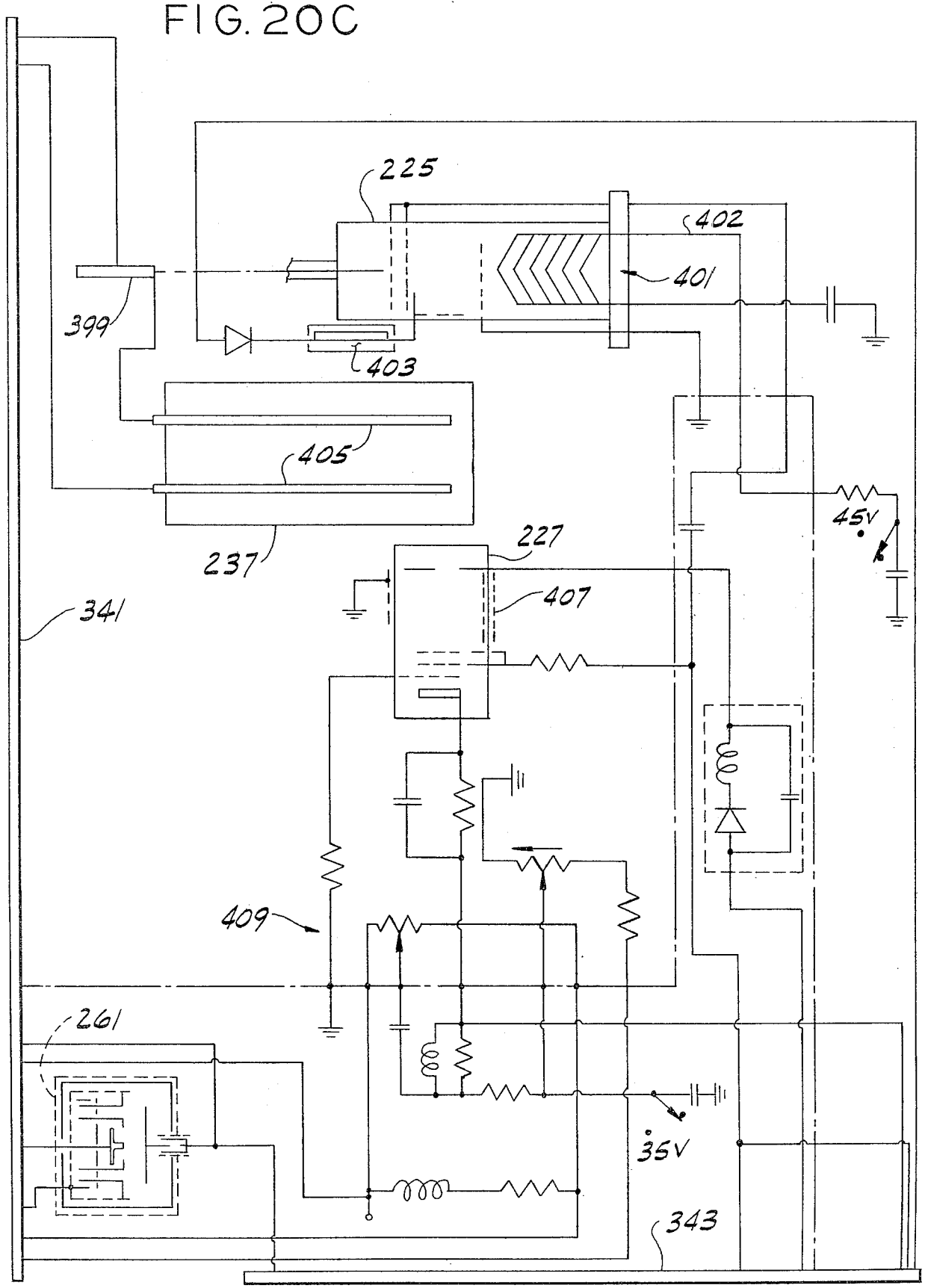
Figure 20D:
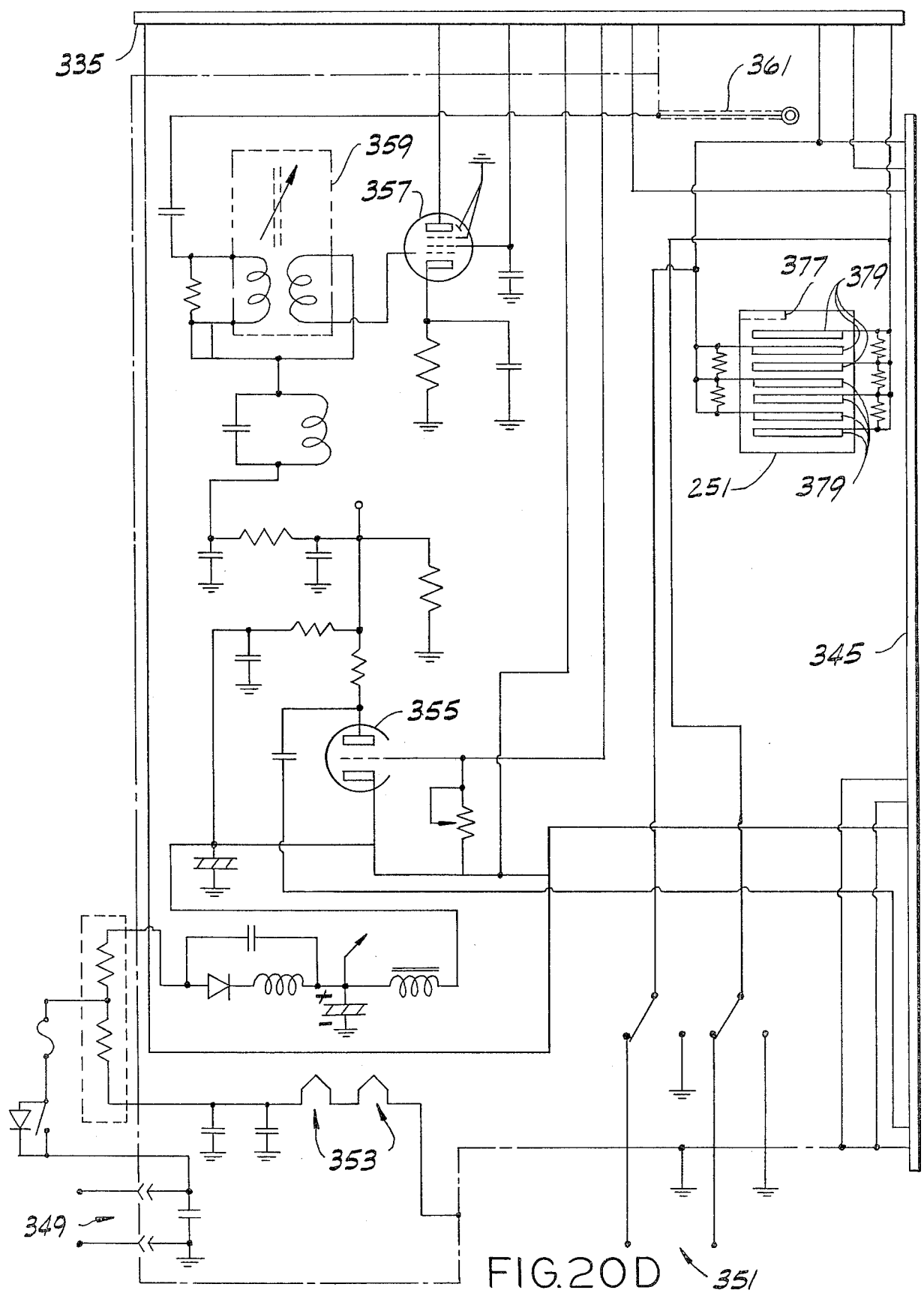

Also shown on FIG. 20D is spark chamber 251. Spark chamber 251 includes a small amount of thorium, indicated at 377, and a plurality of parallel brass plates 379. When the gases in the mixer reach the proper ionization, the alpha particles emitted by the thorium shown up as flashes of light in the spark chamber.

Turning now to FIG. 20B, ionizing and filtering unit 215 includes a pair of conductive supports 381 for a plurality of conductors 383, said supports and conductors being connected to a voltage source, an insulative support 385 for additional conductors 387, and a ZnS screen 388 which emits light when impurities are removed from the gaseous fuel mixture. Unit 215 also includes a second set of interleaved conductors indicated generally at 389, a cold-cathode tube 391, and an x-ray tube indicated generally at 393. Also shown on FIG. 20B is an RLC network 395 which has an output on a line 397 which is at 35 V, this voltage being supplied to the x-ray tube.

High frequency discharge tube 255 (see FIG. 20C) has a conductive electrode 399 at one end to which high frequency current is applied to excite the gases in the mixer, and an electrode/heater arrangement 401 at the other, a voltage of 45 V being applied to an input 402 of said tube. It is desirable that a small quantity of mercury, indicated at 403, be included in tube 225 to promote discharge of the helium gas. Magnetic coils 237 have disposed therein a pair of generally parallel conductors 405 to which a high frequency signal is applied. When gas flows through coils 237 and between parallel conductors 405, therefore, it is subjected to the combination of a DC magnetic field from the coil and high frequency waves from the conductors, which conductors act as transmitting antennas. The resulting high frequency magnetic field causes the atoms to become unstable, which allows the engine to change a given atom's quantum level with much less input power than would normally be required. The volume of each gas atom will also be smaller. Also shown on FIG. 20C is non-directed cathode ray tube 227. The grids of tube 227 are at 145 V, the control electrode is at ground, while the anode is at 35 V to 80 V (peak-to-peak). The purpose of non-directed cathode ray tube 227 is to add photons to the gas mixture. To generate these photons, tube 227 has a two layer ZnS coating indicated generally at 407. Chamber 261, described above, is also shown schematically on FIG. 20C, along with an RLC network 409.

Figure 20E:
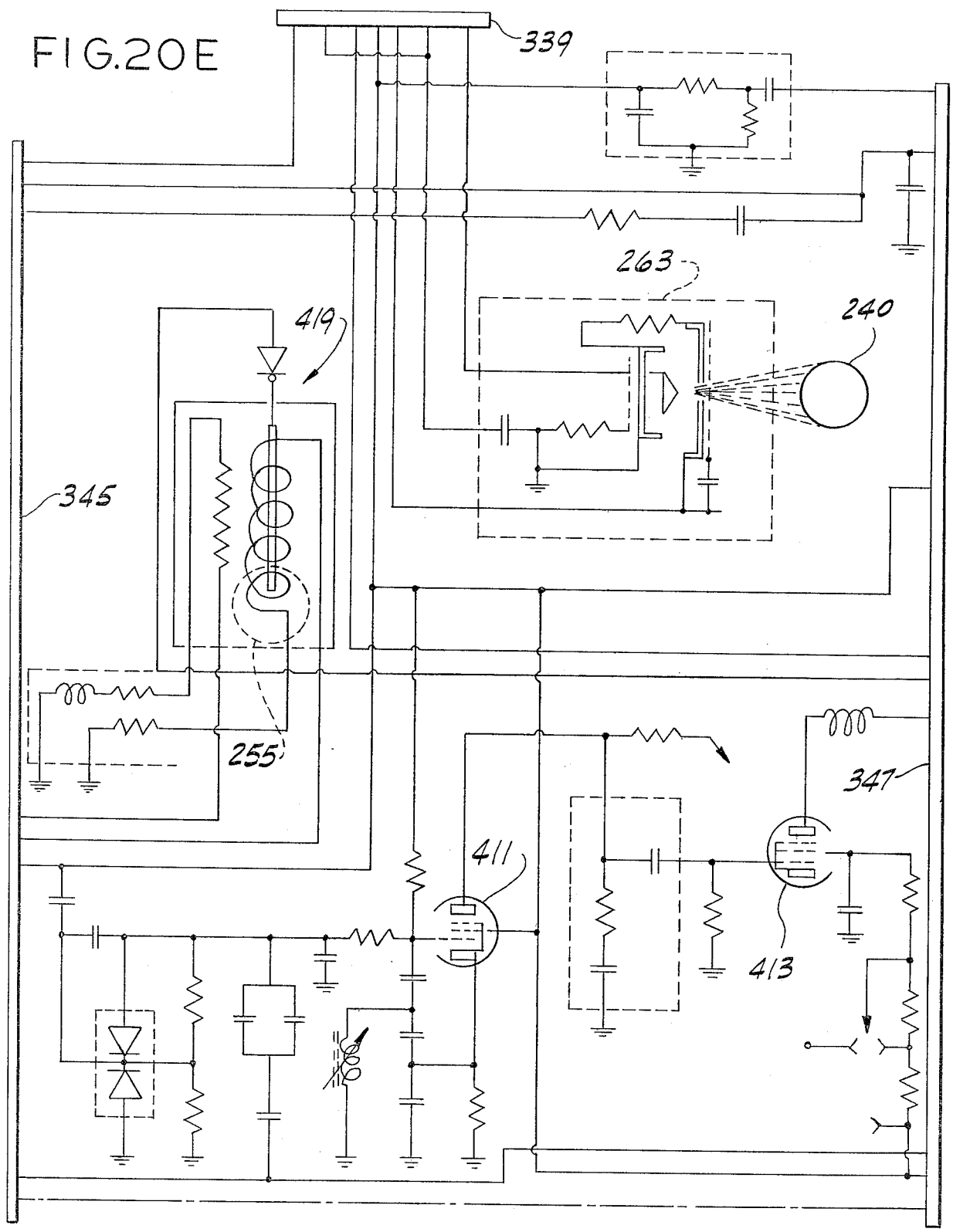

The power supply for the mixer (see the lower halves of FIGS. 20E and 20F) also includes two pentodes 411 and 413, a transformer 415, and a diode tube 417. The control electrode of pentode 411 is at 5 V to 40 V (peak-to-peak), the grids are at 145 V, the anode is at 100 V, and the cathode is at 8 V to 30 V (peak-to-peak). The control electrode of pentode 413 is at 115 V, while its grids and cathode are at −33 V. The anode of tube 413 is connected to transformer 415. Also shown on FIG. 20E are a relay 419 associated with ion gauge 255, and focused x-ray tube 263 associated with ionization head 240. The upper input to tube 263 is at 45 V to 80 V (peak-to-peak).

Figure 20F:
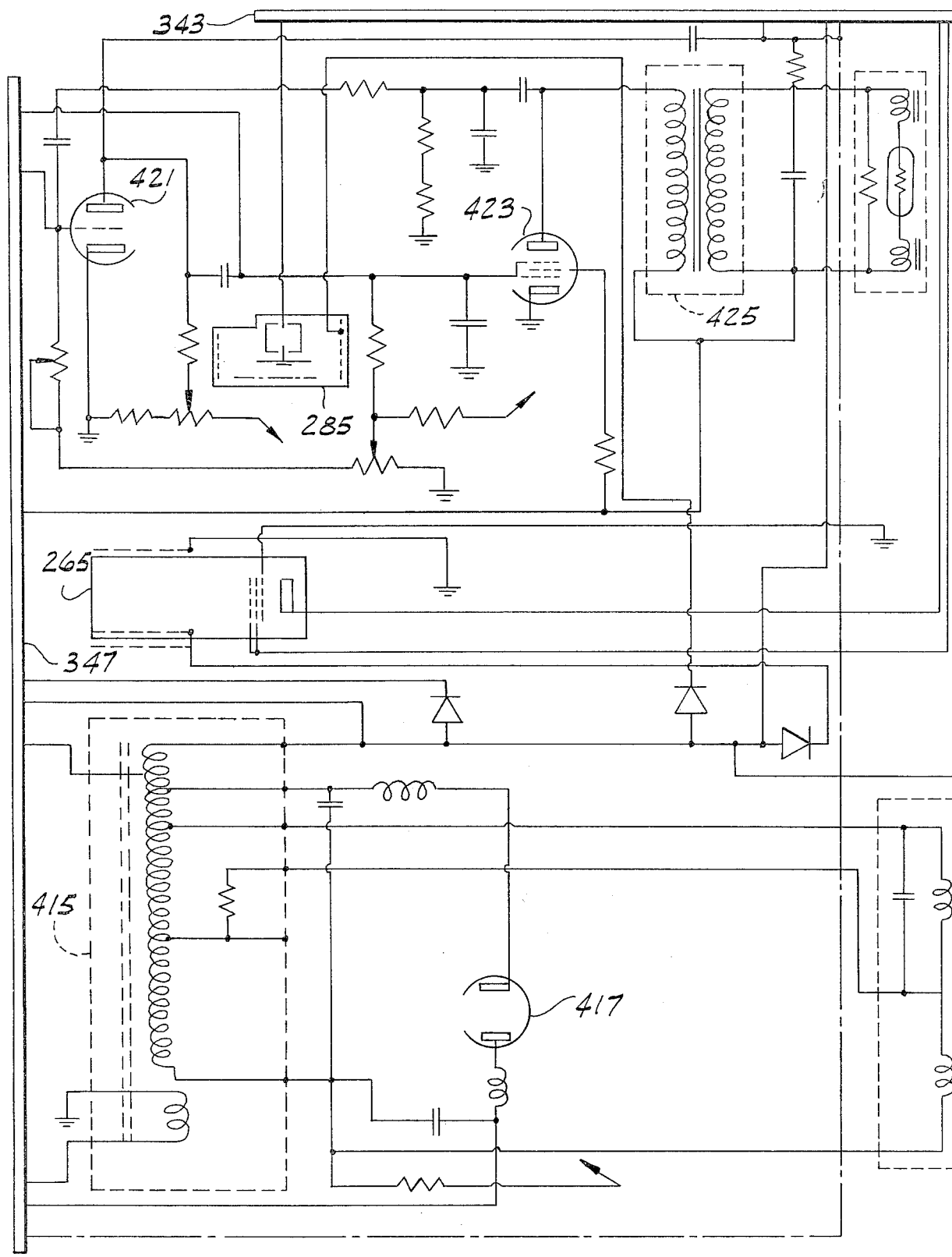

Turning to FIG. 20F, there is shown tubes 265 and 285. Directed cathode ray tube 265 is a pentode connected like tube 227. High frequency discharge tube 285 includes a phosphor screen and is connected to a high frequency source. Also shown on FIG. 20F is a triode 421 with its anode at 30 V, its cathode at ground, and its control grid at −60 V; a pentode 423 with its anode at 135 V to 1000 V peak to peak, its cathode at ground, its control electrode at 143 V, its grids at 20 V; and a transformer 425. It should be understood that various arrangements of electrical components other than those described above could be designed to perform the same functions.

The operation of the mixer is best understood with reference to FIGS. 17A–17D and is as follows: Before and during operation, the mixer, and particularly chamber 261 is kept hermetically sealed and evacuated. To begin the mixing process, helium is admitted into the mixer via intake port 203. Then a vacuum is again drawn, by a vacuum pump (not shown) connected to valve V38, to flush the chamber. This flushing is repeated several times to completely cleanse the tubing branches of the mixer. The mixer is now ready. The ionization heads next to mixing chamber 261 are connected to a voltage corresponding to approximately 36% of the calculated total ionizing voltage, dc current is allowed to flow through magnetic coils 297 and 299 around chamber 261, and high frequency current is allowed to pass through the mixing chamber. Helium is then slowly admitted, via port 203, into the mixer. From port 203, the helium passes through ionization head 219 into glass tubing coil 259. This glass coil, being outside magnetic coils 297 and 299, is in the diverging portion of a magnetic field. The helium slowly flowing through glass coil 259 is gently excited. From coil 259, the helium flows through branch B45 to ionization head 275 and from there, via branch B28, to ionization head 229 (see FIG. 17B). From head 229, the gas flows through non-directed cathode ray tube 227 to high-frequency discharger 225. The high frequency discharger 225, with heating element, discharges, separates or completely neutralizes the charge of any radioactive and/or cosmic particles that are in the helium atom in addition to the protons, neutrons and electrons. The gas exits discharger 225 via branch B26 and passes to high-frequency discharger 285. The high frequency discharger 285, without heating element, disturbs the frequency of oscillation which binds the gas atoms together. This prepares the helium atoms so that the electrons can more easily be split from the nucleus during the excitation and ignition process in the engine. Discharger 285 includes a phosphorus screen or deposit (similar to the coating on a cathode ray tube) which makes discharges in the tube visible. From discharger 285, the helium passes through directed cathode ray tube 265 and focused x-ray tube 263. Directed cathode ray tube 265 produces cathode rays which oscillate back and forth longitudinally underneath and along the gas carrying tube. Thereafter the helium passes successively through branch B21, ionization head 221, branch B23, twin parallel magnetic coil 266, and branch B25 into mixing chamber 261. Helium flows slowly into and through apparatus 201. The helium atoms become ionized as a result of excitation by magnetic force, high frequency vibrations and charge acquired from the ionization heads. When sufficient helium has entered the apparatus, the ionization energy (which is approximately 36% of the total) is totally absorbed. A spectroscopic flash of light in the mixing chamber signals that the precise, proper quantity of helium has been allowed to enter. The entry of helium is then immediately halted by the closing of valve V3.

The next step in preparing the fuel is to add neon to the mixture. The potential on the relevant ionization heads, particularly head 241 (see FIG. 17C), is raised by the addition of approximately 26% which results in a total of approximately 62% of the total calculated potential and valve V31 is opened, thereby allowing neon to slowly enter the mixer via port 245. This gas passes through branch B36, ionization head 241, and branch B35 directly into the mixing chamber. Since the previously admitted helium is fully charged, the neon absorbs all of the increased ionization potential. As soon as the neon acquires the additional charge, a spectroscopic flash of light occurs and the operator closes valve V31.

In the same manner, the potential on the ionization heads is increased by the addition of approximately 17% for a total of approximately 79% of the total calculated potential and then valve V30 is opened to admit argon into the mixer via port 243. This gas passes through branch B34, ionization head 239, and branch B33 into mixing chamber 261. Again, when the proper amount of argon has been admitted, it emits a spectroscopic flash of light and the operator closes valve V30. Next, the potential on the ionization heads is increased by the addition of approximately 13% to result in a total of approximately 92% of the total calculated potential and valve V58 (see FIG. 17D) is opened to admit krypton into the system. The krypton gas passes through branch B51, ionization head 271 and branch B48 into chamber 261. Upon the emission of a spectroscopic flash of light by the gas, the operator closes valve V58. Finally, the potential on the ionization heads is increased by the addition of approximately 8% which brings the ionization potential to the full 100% of the calculated ionization voltage and valve V56 is opened to admit xenon into the mixer via port 279. This gas passes through branch B50, ionization head 273 and branch B47 to the mixing chamber. When the proper amount of gas has been admitted, a spectroscopic flash of light occurs signalling the operator to close valve V56. Note that there are two filter/absorber units, labelled 253 and 291. Unit 253 is connected to the neon and argon inlet branches B33 and B35 while unit 291 is connected to the krypton and xenon inlet branches B47 and B48. These two units absorb hydrogen residue and immobilize the water vapor created when the pump circulates the gases and generates vacuum states.

After all the gases are admitted in the desired proportions, all the valves are closed. (The mixture in the mixing chamber and in the adjacent tubing is at one atmosphere pressure at this time.) Once this is done, the interval valves of the system are all opened (but the inlet and outlet valves remain closed) to allow the mixture to circulate throughout the tubing as follows: branch B44, magnetic coils 267 and 269, ionization head 240, branch B29, ionization head 231, branch B24, ionization head 219, pump 217, branches B15 and B39A, ionization gauge 255, branches B38 and B42, ionization head 275, branch B28, ionization head 229, non-directed cathode ray tube 227, quadruple magnetic coil 272, ionization head 221, branch B23, twin parallel magnetic coil 266, branch B25 and mixing chamber 261. When this circuit is initially opened, the pressure of the mixture drops 40–50% because some of the tubing had previously been under vacuum. Pump 217 is then started to cause the gases to be slowly and evenly mixed.

Because of dead space in the tubing and the reaction time of the operator, it may occur that the proportions of the gases are not exactly those set forth above. This is remedied during the circulation step. As the gas flows through ionization gauge 255, excess gas is removed from the mixture so that the correct proportions are obtained. To do this the grid of gauge 255 is subjected to 100% ionization energy and is heated to approximately 165° F. This temperature, 165° F. is related to xenon's boiling point of −165° F. in magnitude but is opposite in sign. Xenon is the heaviest of the five inert gases in the mixture. As the gas mixture flows through ionization gauge 255, the gas atoms that are in excess of their prescribed percentages are burned out of the mixture and their charge is acquired by the remaining gas atoms from the grid of the ionization gauge. Because the gases are under a partial vacuum, the ionization gauge is able to adjust the gas percentages very precisely. (Note: The steps described in the last two paragraphs are repeated if the finished gases are rejected in the final quality control step described infra.)

The next step involves purifying the mixture so that only the five inert gases remain, absorbing any free electrons and regulating the electrical charge in the mixture. To do this, the circuit consisting of the following components is opened: Branch B44, magnetic coil 267, magnetic coil 269, ionization head 240, branch B29, ionization head 231, branch B24, ionization head 219, pump 217, branches B15 and B39, magnetic coil 287 (see FIG. 17D) polarizer 289, branch B17, ionizing and filtering unit 215, branches B16, B42, and B41, x-ray tube 263, branch B21, ionization head 221, branch B23, magnetic coil 266, branch B25, and mixing chamber 261. The gases should complete this circuit at least three times.

The last step required to prepare the mixture for bottling is polarization of the argon. The circuit required to do this consists of the following components: mixing chamber 261, branch B44, magnetic coil 267, magnetic coil 269, ionization head 240, cathode ray tube 265, branch B40, tubing coil 257, branches B49 and B30, ionization head 231, branch B24, ionization head 219, pump 217, branches B15 and B39, twin parallel magnetic coil 287 (see FIG. 17D), polarizer 289, branch B17, ionizing and filtering unit 215, branches B16, B42 and B20, ionization head 229, cathode ray tube 227, magnetic coil 237, ionization head 221, branch B23 and magnetic coil 266. This too is repeated at least three times. The key to the polarization of argon is polarizer 289 and twin parallel magnetic coil 287 that encircles it. Polarizer 289 is a glass bottle which is filled with finely powdered soft iron which can be easily magnetized. The filled bottle is, in effect, the iron core of the coils. The iron particles align themselves with the magnetic lines of force, which lines radiate from the center toward the north and south poles. The ionized gas mixture is forced through the magnetized iron powder by means of pump pressure and vacuum, thereby polarizing the argon gas. Filters 293 and 295 are disposed as shown in order to filter metallic particles out of the gas.

The mixture is now double-checked by means of spark chamber 251 at atmospheric pressure since the fusion reaction in the engine is started at one atmosphere. Because the gases in mixing apparatus 201 are at a partial vacuum, sufficient gases must be pumped into spark chamber 251 to attain atmospheric pressure. To do this valves V33, V36 and V40A are closed and circulating pump 217 pumps the gases in the mixing apparatus via branches B15 and B39A, through check valve V39A into spark chamber 251 until the vacuum and pressure gauge 242 indicates that the gases within spark chamber 251 are at atmospheric pressure. Valve V34 is then closed. The spark chamber is similar to a cloud chamber. Six or more high capacity brass capacitor plates are spaced $\frac{1}{8}''$ to $\frac{1}{4}''$ apart in the chamber. A small plastic container holds the thorium 232. One side of the chamber is equipped with a thick glass window through which sparks in the chamber may be observed. A potential is placed on the brass plates in the chamber and the current flowing between the plates is measured. If this current exactly corresponds to the ionization current, the mixture is acceptable. A difference of greater than 5% is not acceptable. A lesser difference can be corrected by recirculating the gas in the mixer and particularly through ionization gauge 255 as previously described in the circulation step. A second test is then given the gases that pass the first test. A calculated high frequency current is gradually imposed on the spark chamber capacitor plates. This excitation causes neutrons to be emitted from the thorium 232 which, if the mixture is satisfactory, can be easily seen as a thin thread of light in the chamber. If the mixture is not satisfactory, light discharges cannot be seen and the high frequency circuit will short out and turn off before the desired frequency is reached.

To bottle the mixture, valve V33 is opened and valves V36 and V40 are closed. During bottling polarizer 289, twin parallel magnetic coil 287, ionization unit 215 and ion gauge 255 are electrically energized (all electrical circuits are previously deenergized) to improve the stability of the mixture. The prepared gases are withdrawn from the mixing apparatus via branches B24 and B16, ionization unit 215, branch B17, filters 293 and 295, polarizer 289, twin parallel magnetic coil 287, branch B39, ion gauge 255, check valve V39A, branch B38 and spark chamber 251. If desired, after bottling the mixer may be exhausted by opening valves V12, V13, V14, V23, V24, V29, V32, V57 and V59. Of course, one can also automate the fuel preparation process to be continuous so that it would never be necessary to exhaust the gas.

In operation of mixing apparatus 201, certain operational factors must be considered. For one, no electrical devices can be on without the pump being in operation because an electrical device that is on can damage adjacent gas that is not circulating. For another, it should be noted that directed cathode ray tube 265, non-directed cathode ray tube 227 and focused x-ray tube 263 serve different functions at different points in the mixing process. In one mode, they provide hot cathode radiation, which can occur only in a vacuum. When gases are flowing through these devices, they provide a cold cathode discharge. For example, during argon polarization and the circulation step, focused x-ray tube 263 is under vacuum and affects the gases flowing through ionization head 240 by way of hot cathode radiation. During the introduction of the different gases into mixing apparatus 201 and during the recirculation step, the gases are flowing through focused x-ray tube 263, which affects the gases by way of a cold cathode discharge.

It is preferred that each switchable electrical component in mixing apparatus 201 be wired into a separate circuit despite the fact that one of the poles of each could be commonly wired. In a common ground circuit if one device is turned on, all of the other units may also turn on because the gases in the device are conductive. In addition, if one unit on a common circuit were energized with high frequency current, the others would also be affected. In the same vein, the high frequency current cannot be used when the cathode ray tubes, the x-ray tubes or the dischargers are heated and under vacuum because the heater filaments will burn out.

Finally, the current source, the variable rectifiers and the electrical measuring instruments must be located more than ten feet from mixing apparatus 201 because the high frequency current is harmful to the rectifiers, causing them to burn out or short out.

It is hoped that a brief summary of the concepts used by the inventor in developing the above invention will be helpful to the reader, it being understood that this summary is in no way intended to limit the claims which follow or to affect their validity. The first concept is that of using an inert gas mixture at approximately one atmosphere at TDC (at ignition) as a fuel in a thermonuclear energy production process. The second concept is the layering of the various inert gases, which layering is designed to confine the input energy in the innermost layers during pre-excitement and ignition, to provide thermal insulation for the container walls during and after ignition, to transmit power resulting from the ignition through the layers in turn to the piston, to absorb the pressure generated during ignition to protect the cylinder walls, and to provide an orderly, predictable positioning of the argon layer during the BDC to TDC portion of the engine cycle. The third concept of this invention involves utilizing electric current produced in one cylinder of a pair to perform functions in the other cylinder of that pair. This concept includes the sub-concepts of generating electric current by atomic recombination and of electric generation in place resulting from the rotation of layered inert gases within each cylinder because of the changed polarity of the encircling coils at BDC, from judicious placement of coils which produce magnetic field lines which are cut by a near perfect conductor (polarized argon), and from movement of said near perfect conductor through the magnetic field.

The fourth and fifth concepts of this invention are the transformation of rapid, intense, but short duration thermonuclear reactions into pressure that is transmitted from inert gas to inert gas until it creates linear kinetic energy at the piston, which energy is converted into rotary kinetic energy by a crankshaft, and the use of a shaft-driven generator to provide power to spaced field coils during the BDC to TDC portion of the cycle of each cylinder.

The sixth concept concerns adequate pre-excitement of the inert gas fuel and more particularly involves the sub-concepts of pre-exciting the fuel in the mixing process, of manipulation of the currents in the coils surrounding each cylinder, of discharging the capacitors surrounding each cylinder at predetermined times in the cycles, of causing a stream of electrical particles to flow between electrodes and a conductive discharge point on the piston, of emitting alpha, beta and gamma rays from an anode and a cathode containing low level radioactive material to the piston's discharge point, of accelerating the alpha, beta and gamma rays by the application of a high voltage field, and of situating capacitor plates 90 degrees from the anode and cathode to slow and reflect neutrons generated during ignition. The seventh concept involves the provision of a minute, pellet-type fission ignition, the heat from which causes a minute fusion as the result of the ignition chamber shape and arrangement, as a result of the collision of the alpha, beta and gamma rays and the electrical particles at a focal point in conjunction with the discharge of the capacitors that surround the cylinder through the electrodes, and as a result of increasing the magnetic field in the direction of the movement of each piston.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:

1. An engine having a closed chamber for a working fluid, comprising:
   a head having a generally concave depression therein, the head defining one end of the chamber;
   a piston having a generally semitoroidal depression in its upper surface, the piston being axially movable with respect to the head from a first position to a second position and back, the piston defining the other end of the chamber, the volume of the chamber being determined by the position of the piston relative to the head; and
   means, including a plurality of electrodes extending into the chamber, for ionizing the working fluid, said working fluid consisting essentially of an inert gas mixture of helium, neon, xenon, krypton and argon, said argon constituting approximately 17% of the mixture by volume.

2. Apparatus as set forth in claim 1 wherein the piston includes a conductive discharge point which is carried by the piston generally along the axis of the chamber and wherein the electrodes are generally equidistantly spaced from said axis, the discharge point being disposed generally intermediate the electrodes and in close proximity thereto when the piston is in its first position and being disposed a substantial distance from the electrodes when the piston is in its second position.

3. Apparatus as set forth in claim 1 wherein at least four electrodes extend into the chamber, the electrodes being generally equidistantly spaced from the axis of the chamber and each being disposed generally 90° from the adjacent electrodes, lines between opposed pairs of said electrodes intersecting generally on the axis of the chamber to define a focal point.

4. Apparatus as set forth in claim 3 wherein one of the electrodes is a brass container having rubidium and phosphorous disposed therein.

5. Apparatus as set forth in claim 3 wherein one of the electrodes is an aluminum container having thorium and phosphorous disposed therein.

6. Apparatus as set forth in claim 3 wherein two of the electrodes have relatively sharp points and wherein the piston includes a conductive discharge point which is carried by the piston generally along the axis of the chamber, the pointed electrodes and the discharge point on the piston forming spark gaps when the piston is in its first position.

7. Apparatus as set forth in claim 6 wherein the material of the two electrode points is selected from the group consisting of tungsten and tantalum.

8. Apparatus as set forth in claim 6 wherein the two electrodes with points further include plates disposed generally at right angles to the axes of the pointed electrodes.

9. Apparatus as set forth in claim 1 wherein the chamber has a generally toroidal shape and a volume of at least approximately 6.0 cubic inches (100 cm$^3$) and no greater than approximately 1500 cubic inches (25,000 cm$^3$) when the piston is in its first position, said piston being nearest the head when in its first position.

10. Apparatus as set forth in claim 1 wherein the pressure in a cylinder when its piston is at top dead center is approximately one atmosphere.

11. Apparatus as set forth in claim 1 wherein krypton constitutes approximately 13% and xenon constitutes approximately 8% of the inert gas mixture by volume.

12. An engine having a closed chamber for a working fluid, comprising:
    a head which defines one end of the chamber;
    a piston which defines the other end of the chamber, the piston being axially movable with respect to the head from a first position to a second position and back, the volume of the chamber being determined by the position of the piston relative to the head;
    at least two electric coils wound around the chamber for generating magnetic fields inside the chamber, said coils being generally coaxial with the chamber; and
    means, including a plurality of electrodes extending into the chamber, for exciting the working fluid, the working fluid consisting essentially of an inert gas mixture of helium, neon, xenon, krypton and argon, said argon constituting approximately 17% of the mixture by volume.

13. Apparatus as set forth in claim 12 wherein krypton constitutes approximately 13% of the inert gas mixture by volume.

14. Apparatus as set forth in claim 12 wherein xenon constitutes approximately 8% of the inert gas mixture by volume.

15. Apparatus as set forth in claim 12 further including means for individually energizing the coils.

16. Apparatus as set forth in claim 15 wherein there are at least three coils, said energizing means being operable so that all the coils are energized during movement of the piston from its first to its second position and being operable so that less than all the coils are energized during movement of the piston from its second to its first position.

17. Apparatus as set forth in claim 15 wherein the energizing means includes means for energizing at least one coil with a given polarity when the piston is moving from its first position to its second position and with the opposite polarity when the piston is moving from its second position to its first position.

18. Apparatus as set forth in claim 12 further including layered capacitor plates around the chamber.

19. Apparatus as set forth in claim 12 further including shielding disposed around the sides of the chamber for preventing nuclear particles formed in the chamber from escaping from the apparatus.

20. Apparatus as set forth in claim 19 wherein the shielding includes finely divided graphite in a binder.

21. Apparatus as set forth in claim 20 wherein the binder includes a material selected from the group consisting of fiberglass and hardened epoxy resin.

22. Apparatus as set forth in claim 12 having a plurality of closed chambers for a working fluid, each closed chamber having associated therewith a head, a piston and a plurality of electrodes, each head defining one end of its respective chamber, each piston defining the other end of its respective chamber, the electrodes associated with each chamber extending therein for ionizing the working fluid, each piston being axially movable with respect to its respective head from a first position to a second position and back, the volume of each chamber being determined by the position of its piston relative to its head.

23. Apparatus as set forth in claim 22 wherein the engine has an even number of functional chambers.

24. Apparatus as set forth in claim 23 wherein the pistons and associated chambers are paired, each piston being substantially in the first position with respect to its head when the other piston of that pair is substantially in the second position.

25. Apparatus as set forth in claim 24 further including means for closing a circuit for flow of current from one chamber of a pair to the other during a portion of the cycle of the first chamber and for closing a circuit for flow of current from the second chamber to the first during a different portion of said cycle.

26. Apparatus as set forth in claim 22 further including means for supplying a time varying electrical voltage to the electrodes.

27. Apparatus as set forth in claim 26 wherein the supply means includes means for supplying the time varying voltage during a predetermined portion of the cycle of each piston.

28. Apparatus as set forth in claim 22 wherein the ionizing means further includes means for supplying high voltage pulses to the electrodes.

29. Apparatus as set forth in claim 28 wherein the pulse supplying means includes means for supplying said pulses at predetermined times during the cycle of each piston.

30. Apparatus for preparing a mixture of inert gases consisting essentially of helium, neon, xenon, krypton and argon for use as a working fluid, said argon constituting approximately 17% of the mixture by volume, said apparatus comprising:
a substantially nonconductive and nonmagnetic mixing chamber;
means for generating predetermined magnetic fields inside the mixing chamber;
substantially nonconductive and nonmagnetic tubing means adapted to be connected to sources of the helium, neon, xenon, krypton and argon gases for flow of the gases from the sources to the mixing chamber;
ionizing means disposed between the sources of inert gases and the mixing chamber for ionizing the gases, said ionizing means including a plurality of separate ionizers, each inert gas having at least one ionizer associated therewith, each ionizer being disposed between the source of its associated gas and the mixing chamber; and
means for supplying electrical current at various predetermined potentials to the ionizing means, each inert gas having associated therewith its own predetermined potential to be applied to the ionizing means as said gas is admitted into the mixing chamber.

31. Apparatus as set forth in claim 30 wherein the apparatus is at least partially transparent whereby a flash of light indicating a predetermined level of ionization of a inert gas may be seen by an observer.

32. Apparatus as set forth in claim 30 wherein the magnitudes of the predetermined potentials are arranged in the same order as the atomic weights of their associated inert gases.

33. Apparatus as set forth in claim 30 further including a grid in the mixing chamber to which a high frequency signal is applied during operation.

34. Apparatus as set forth in claim 33 wherein the frequency of the signal is in the range from approximately 27,000 MHz to approximately 40,000 MHz.

35. Apparatus as set forth in claim 30 wherein the tubing means includes two coils of tubing disposed around the mixing chamber and coaxial therewith.

36. Apparatus as set forth in claim 30 further including means for extracting contaminants from the inert gas mixture.

37. Apparatus as set forth in claim 30 further including an ionization gauge and means for applying a predetermined potential thereto.

38. Apparatus as set forth in claim 37 wherein the predetermined potential applied to the ionization gauge is substantially equal to the predetermined potential associated with the inert gas in the mixture having the largest atomic weight.

39. Apparatus as set forth in claim 30 wherein the tubing means includes a coil of tubing disposed around the mixing chamber and coaxial therewith, and wherein the magnetic field generating means includes a magnetic coil disposed between said coil of tubing and the mixing chamber, whereby said coil of tubing during operation is disposed in a diverging magnetic field generated by said electrical coil.

40. Apparatus as set forth in claim 30 further including means for generating photons to excite at least one inert gas.

41. Apparatus as set forth in claim 40 wherein the photon generating means includes means for creating cathode rays and a screen upon which said rays impinge to create said photons.

42. Apparatus as set forth in claim 30 further including means disposed outside the mixing chamber for subjecting at least one of the inert gases to a high frequency signal, the frequency of said signal being in the range from approximately 27,000 MHz to approximately 40,000 MHz.

43. Apparatus as set forth in claim 30 further including means for generating X-rays to excite at least one inert gas.

44. Apparatus as set forth in claim 43 wherein the X-ray generating means is disposed outside the mixing chamber.

45. Apparatus as set forth in claim 30 further including magnetic field means for generating predetermined magnetic fields at predetermined places in the tubing means.

46. Apparatus as set forth in claim 45 wherein the magnetic field means includes means for generating a focusing magnetic field outside the mixing chamber.

47. Apparatus as set forth in claim 45 wherein the magnetic field means includes a plurality of magnetic coils disposed coaxially with each other along a portion of the tubing means.

48. Apparatus as set forth in claim 47 further including a pair of electrodes disposed inside said magnetic coils and extending generally parallel to the axis of said coils, and means for supplying a high frequency signal to said electrodes, the frequency of said signal being in the range from approximately 27,000 MHz to approximately 40,000 MHz.

49. Apparatus as set forth in claim 47 wherein there are at least four coaxially disposed magnetic coils.

50. Apparatus as set forth in claim 30 wherein the mixing chamber magnetic field means includes a pair of magnetic coils disposed coaxially with the mixing chamber and separated by a gap near the mid-point of the mixing chamber and a semicircular yoke coil disposed in said gap.

51. Apparatus as set forth in claim 30 further including a pump for pumping the inert gas mixture through the apparatus.

52. Apparatus as set forth in claim 30 further including a container of finely divided, soft magnetic iron, and means for magnetizing said iron, said container being disposed along the tubing means, whereby the inert gas mixture may be pumped through said container.

53. Apparatus as set forth in claim 30 further including a spark chamber for testing the inert gas mixture.

54. Apparatus as set forth in claim 53 wherein the spark chamber has associated therewith a container containing a radioactive substance.

55. Apparatus as set forth in claim 54 wherein the radioactive substance is thorium.

56. A working fluid in an engine for producing mechanical energy, said working fluid consisting essentially of a mixture of an inert gas mixture of helium, neon, xenon, krypton and argon, said argon constituting approximately 17% of the mixture by volume.

57. A working fluid as set forth in claim 56 wherein neon constitutes approximately 26% of the mixture by volume.

58. A working fluid as set forth in claim 56 wherein xenon constitutes approximately 8% of the mixture by volume.

59. A working fluid as set forth in claim 56 wherein helium constitutes approximately 36% of the mixture by volume.

60. A working fluid as set forth in claim 56 wherein krypton constitutes approximately 13% of the mixture by volume.

61. A working fluid for use in a closed chamber of an engine to produce mechanical energy consisting essentially of helium, neon, argon, krypton, and xenon, said neon constituting approximately 26% of the mixture by volume, said argon constituting approximately 17% of the mixture by volume, said krypton constituting approximately 13% of the mixture by volume, and said xenon constituting approximately 8% of the mixture by volume.

62. A working fluid as set forth in claim 61 wherein helium constitutes approximately 36% of the mixture by volume.

63. An energy system including an engine having a closed chamber for a working fluid, said engine comprising a head which defines one end of the chamber; a piston which defines the other end of the chamber, the piston being axially movable with respect to the head from a first position to a second position and back, the volume of the chamber being determined by the position of the piston relative to the head; means for generating magnetic fields inside the chamber; and means, including a plurality of electrodes extending into the chamber, for ionizing the working fluid, the working fluid consisting essentially of a mixture of inert gases of helium, neon, xenon, krypton and argon, said argon constituting approximately 17% of the mixture by volume; said energy system further including a second chamber for storing additional working fluid.

64. Apparatus as set forth in claim 63 wherein said second chamber is disposed in said engine.

65. Apparatus as set forth in claim 64 wherein said second chamber is disposed in said head and wherein at least one of the electrodes extends through said head and has disposed therein a passageway for passage of working fluid from the second chamber to the first chamber.

66. Apparatus as set forth in claim 63 further including a sensor for sensing the pressure in the first chamber when the piston is in its first position.

67. Apparatus as set forth in claim 66 wherein a passageway extends between said first and second chamber and further including a valve disposed in said passageway and controlled by said sensor for allowing additional working fluid to flow from the second chamber to the first chamber only if the pressure of the working fluid when the piston is in its first position falls below a predetermined level.

68. Apparatus as set forth in claim 67 wherein the valve includes means for allowing working fluid to pass from the first chamber to the second chamber if the pressure of the working fluid when the piston is in its first position exceeds a predetermined level.

69. Apparatus as set forth in claim 63 wherein a passageway extends between said first and second chambers, further including a valve disposed in said passageway, said valve being manually operable to allow working fluid to flow from the second chamber to the first.

70. Apparatus as set forth in claim 69 wherein the valve is also manually operable to allow working fluid to flow from the first chamber to the second.

71. Apparatus as set forth in claim 63 further including a valve which opens to exhaust working fluid from the second chamber if the pressure in the second chamber exceeds a predetermined level.

* * * * *